(12) United States Patent
Parker et al.

(10) Patent No.: US 6,413,618 B1
(45) Date of Patent: Jul. 2, 2002

(54) LAMINATED GLASS FLOOR TILE AND FLOORING MADE THEREFROM AND METHOD FOR MAKING SAME

(75) Inventors: Anthony A. Parker, Newtown, PA (US); Peter J. Rohrbacher, Bordentown, NJ (US); Scott M. Wootten, Langhorne, PA (US); John A. Shost, Allentown, NJ (US); Richard A. Sabo, Yardville, NJ (US); Robert Dempsey, Flemington, NJ (US)

(73) Assignee: Congoleum Corporation, Trenton, NJ (US)

( * ) Notice: Subject to any disclaimer, the term of this patent is extended or adjusted under 35 U.S.C. 154(b) by 0 days.

(21) Appl. No.: 09/309,614

(22) Filed: May 11, 1999

(51) Int. Cl.[7] ................................................. B32B 3/10
(52) U.S. Cl. ..................... 428/195; 428/49; 428/204; 428/46
(58) Field of Search ................. 428/44, 49, 172, 428/201, 204, 207, 210, 410, 426, 427, 428, 441, 46, 195, 13; 52/475.1, 390, 385, 387, 384

(56) References Cited

U.S. PATENT DOCUMENTS

| | | | |
|---|---|---|---|
| 4,093,216 A | 6/1978 | Dunn | 273/6 |
| 4,204,029 A | 5/1980 | Batchelor et al. | 428/441 |
| 4,309,484 A | 1/1982 | Ohmae et al. | 428/441 |
| 4,546,019 A | * 10/1985 | Schneider | 428/13 |
| 4,600,627 A | 7/1986 | Honda et al. | 428/203 |
| 4,822,684 A | 4/1989 | Hotta et al. | 428/426 |
| 4,840,824 A | * 6/1989 | Aristodimou | 428/46 |
| 4,931,331 A | 6/1990 | Owens | 428/47 |
| 4,968,553 A | * 11/1990 | Cesar | 428/13 |
| 5,023,140 A | 6/1991 | Glotfelter et al. | 428/413 |
| 5,077,112 A | 12/1991 | Hensel et al. | 428/76 |
| 5,091,487 A | 2/1992 | Hori et al. | 526/87 |
| 5,094,918 A | 3/1992 | Niwa et al. | 428/440 |
| 5,145,746 A | 9/1992 | Tomoyuki | 428/458 |
| 5,208,086 A | 5/1993 | Owens | 428/47 |
| 5,246,764 A | 9/1993 | LaPorte et al. | 428/195 |

(List continued on next page.)

FOREIGN PATENT DOCUMENTS

| | | |
|---|---|---|
| DE | 513707 A2 | 5/1992 |
| DE | 513707 B1 | 4/1995 |
| DE | 513707 B2 | 1/1999 |
| WO | WO 97/32732 | 9/1997 |
| WO | WO 98/52700 | 11/1998 |
| WO | WO 99/06336 | 2/1999 |
| WO | WO 99/33906 | 7/1999 |
| WO | WO 00/09332 | 2/2000 |

OTHER PUBLICATIONS

Brochure: Novaglass Saint–Gobain Deutsche Glas / Erleben Sie die neue Boder. Obtained Jan. 17, 1999 at Domotex, a yearly trade show in Hanover, Germany. English translation provided.
Joan Spector; *Future Is Bright For Glass Tile*; Tile & Decorative Surfaces, vol. 49, No. 9; Dec. 23, 1999; 4 pp.
Product Installation; Ann Sacks Tile & Stone, Inc.; 5 pp., Jan. 1997.
Product Installation; Ann Sacks Tile & Stone, Inc.; 1 p. (no date).
Designs by Judy Wrede; 1 p. (product brochure) (no date).
Dolce; 1 p. (product brochure) (no date).

*Primary Examiner*—Alexander S. Thomas
(74) *Attorney, Agent, or Firm*—Pennie & Edmonds LLP

(57) ABSTRACT

A laminated glass floor tile is disclosed, comprising a glass plate, a backing substrate and a decorative layer disposed between the glass plate and the backing substrate. A glass flooring made using laminated glass floor tiles is also disclosed, as well as, a method for making a laminated glass floor tile comprising the steps of placing a decorative layer between a backing substrate and a glass plate and laminating the glass plate, the backing substrate and the decorative layer.

52 Claims, 11 Drawing Sheets

U.S. PATENT DOCUMENTS

| | | | |
|---|---|---|---|
| 5,252,655 A | 10/1993 | Parker et al. | 524/430 |
| 5,277,952 A | 1/1994 | Watras | 428/46 |
| 5,304,272 A | 4/1994 | Rohrbacker et al. | 156/209 |
| 5,314,554 A | 5/1994 | Owens | 156/154 |
| 5,352,528 A | 10/1994 | L'Her et al. | 428/426 |
| 5,505,808 A | 4/1996 | Hallman et al. | 156/233 |
| 5,543,173 A | 8/1996 | Horn, Jr. et al. | 427/212 |
| 5,547,762 A | 8/1996 | Niwa et al. | 428/442 |
| 5,590,500 A | 1/1997 | McCue | 42/311.2 |
| 5,593,786 A | 1/1997 | Parker et al. | 428/426 |
| 5,605,751 A * | 2/1997 | Suzuki et al. | 428/46 |
| 5,624,761 A | 4/1997 | Sakamoto et al. | 428/426 |
| 5,632,835 A | 5/1997 | Niwa et al. | 156/99 |
| 5,641,845 A | 6/1997 | Park et al. | 526/273 |
| 5,715,636 A | 2/1998 | Taylor | 52/308 |
| 5,720,835 A | 2/1998 | Lingart et al. | 156/89 |
| 5,756,617 A | 5/1998 | Park et al. | 526/202 |
| 6,110,544 A * | 8/2000 | Yang et al. | 427/580 |

* cited by examiner

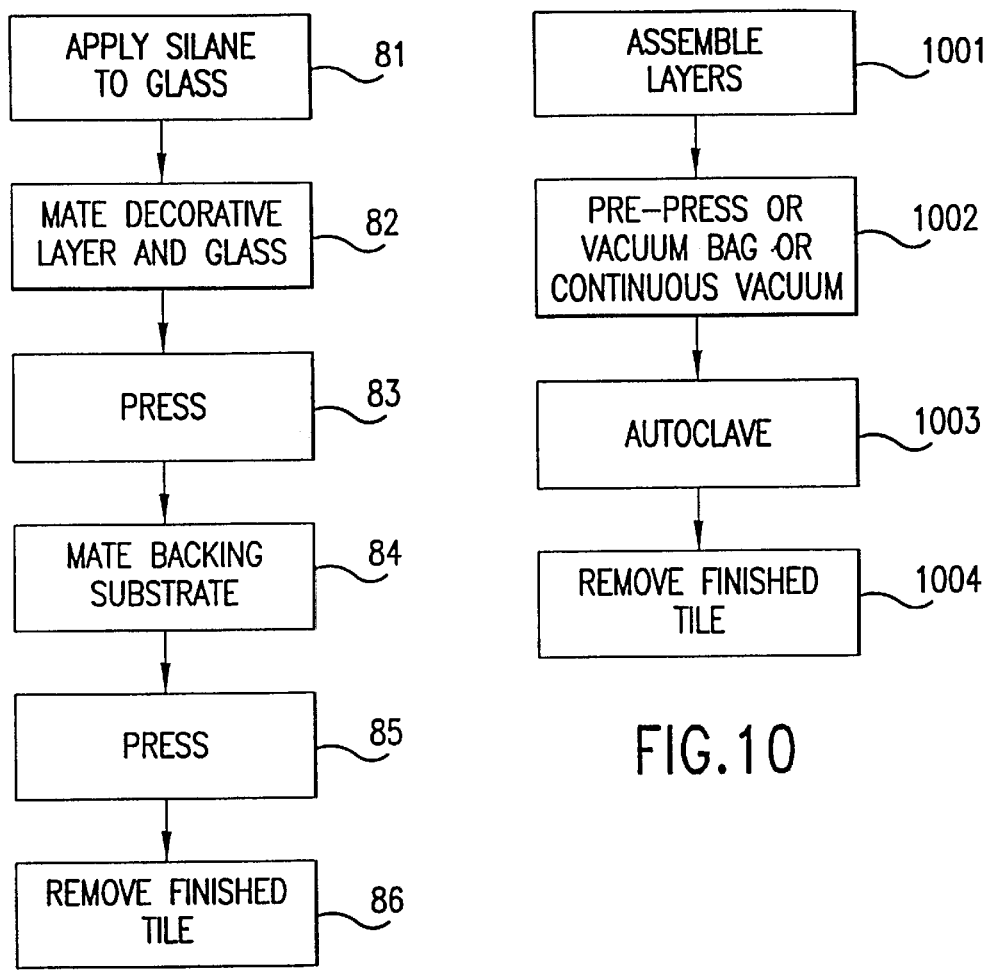
FIG.8
FIG.10
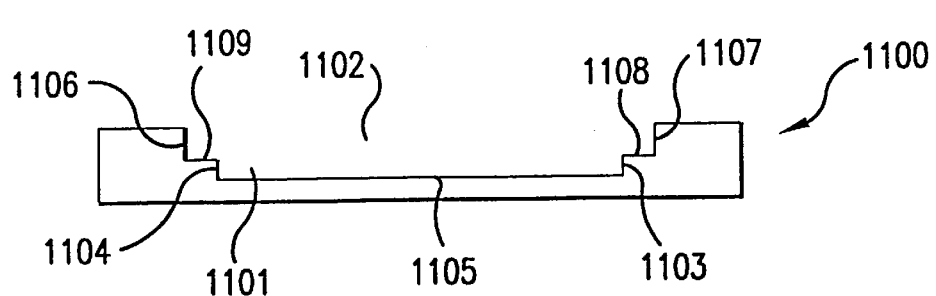
FIG.11

LAMINATED GLASS FLOOR TILE AND FLOORING MADE THEREFROM AND METHOD FOR MAKING SAME

BACKGROUND OF THE INVENTION

1. Field of the Invention

The invention relates generally to materials for flooring. More specifically, the invention relates to a laminated glass floor tile and flooring made therefrom and a method for making the glass floor tile.

2. Description of Related Art

There are many types of flooring materials which are placed on top of the sub-flooring structure including hardwood, organic or polymeric sheets (e.g., linoleum) and tile (e.g., ceramic or stone). However, each of these flooring materials has certain limitations. For example, hard wood floors scratch easily and may be damaged if a heavy object is dropped on them. Organic or polymeric floors are susceptible to scuffing, cuts and nicks induced by falling objects or objects which are moved across their surface. Tile, such as ceramic or marble tile, may also be damaged by objects dropped on the tile and are susceptible to scratching. Furthermore, tile is difficult to repair, requiring the removal and replacement of a tile including re-grouting.

Glass is a material that has desirable properties for use as flooring, such as scratch resistance, ease of cleaning, resistance to staining and relatively low cost. Furthermore, glass can be of decorative value based upon its transparency and because it can be sandblasted or etched in a decorative fashion to reflect light in a visually pleasing manner. However, glass may be easily broken, and for this reason, glass has generally not been readily available as a flooring material.

U.S. Pat. No. 5,715,636 to Taylor describes a light transmitting roof/floor where a glass plate is utilized as a roof or floor to allow light to pass through the plate. The glass plate is supported in part by a plate member made of transparent or translucent material such as a high strength acrylic plastic. This plate member extends around and is laminated to only the perimeter of the glass plate to avoid obstructing the passage of light through the glass plate.

U.S. Pat. No. 5,277,952 to Watras describes a cracked glass laminate having an intermediate layer of tempered glass laminated on one side to an outer layer of annealed glass. A backing layer is laminated to the other side of the intermediate layer. For use as flooring or for countertops, however, the laminate is placed in a recess and a polymer is placed over the top of the annealed glass layer to encapsulate the glass laminate thereby providing protection for the outer layer of annealed glass.

Based on the foregoing, there is a need for a laminated glass floor tile, and a flooring made therefrom, having an exposed top layer of glass which does not require additional surface layers of material for protection. Furthermore, there is a need for a method to make such laminated glass floor tile.

SUMMARY OF THE INVENTION

Accordingly, the present invention provides a laminated glass floor tile and a flooring made therefrom, in which the glass is the exposed top layer of the tile. Further, the laminated glass floor tile has a decorative pattern observable through the exposed glass. The laminated glass floor tile of the present invention can be easily installed with other such tiles as a complete flooring material. Moreover, such installation may be made in conjunction with floating subfloors, flexible adhesives and flexible plywood subfloors. The laminated glass floor tile of the present invention is relatively resistant, compared to other flooring materials, to scratching, breakage and other physical damage, and to water and other elements to which flooring is typically exposed. The present invention also provides a method for making the laminated glass floor tile.

These and other features of the present invention are provided by a laminated glass floor tile comprising a glass plate, a backing substrate and a decorative layer disposed between the glass plate and the backing substrate. The decorative layer may be a decorative pattern printed on the backing substrate that is visible through the glass plate, or it may be a film having a decorative pattern disposed thereon. A glass flooring made using laminated glass floor tiles is also disclosed, as well as, a method for making a laminated glass floor tile comprising the steps of placing a decorative layer between a backing substrate and a glass plate and laminating the glass plate, the backing substrate and the decorative layer.

These and other features of the invention will appear from the following description from which the preferred embodiments are set forth in detail in conjunction with the accompanying drawings.

BRIEF DESCRIPTION OF THE DRAWINGS

FIG. 8 is a process schematic of a press lamination process for making a laminated glass floor tile according to the present invention;

FIG. 10 is a process schematic of an autoclave process for making a laminated glass floor tile according to the present invention;

FIG. 11 is an elevational view of a template cavity; and

DETAILED DESCRIPTION OF THE PREFERRED EMBODIMENTS

Generally, the laminated glass floor tile of the present invention comprises a glass plate, a backing substrate and a decorative layer disposed between the glass plate and the backing substrate. This entire assembly is then laminated by any lamination process known in the art. The decorative layer may be, for example, a printed or painted ink pattern on either the top side of the backing substrate or the bottom side of the glass plate, or it may be a separate film placed between the glass plate and the backing substrate. An adhesive may be necessary to insure adequate bonding between the layers depending upon their composition. The following description in conjunction with the accompanying figures describes several preferred embodiments of the present invention.

Figure 1:
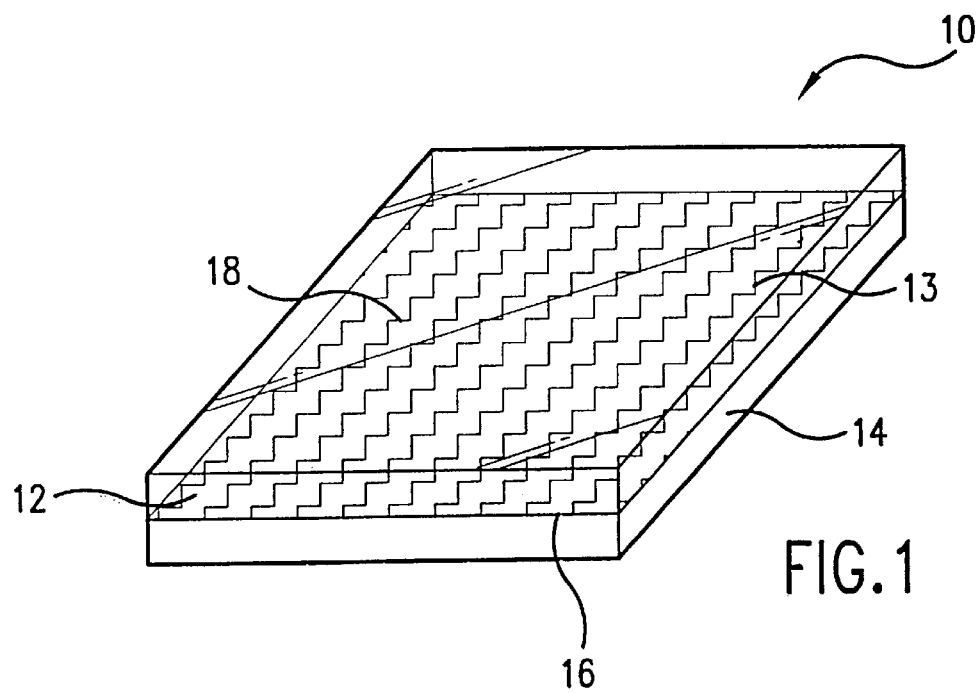
FIG. 1 is a perspective view of one embodiment of a laminated glass floor tile according to the present invention.
Figure 1A:
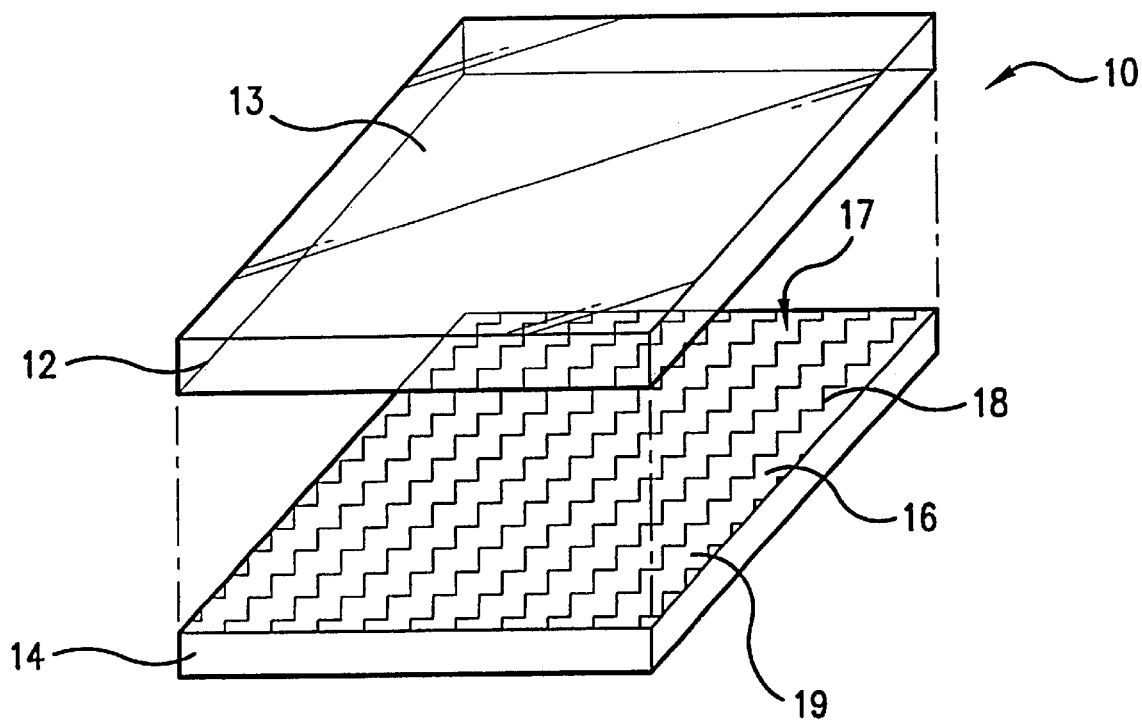
FIG. 1A is an exploded view of the laminated glass floor tile of FIG. 1.

FIG. 1 shows one embodiment of a laminated glass floor tile 10 according to the present invention, and FIG. 1A shows an exploded view of the glass floor tile 10 of FIG. 1. The glass floor tile 10 comprises a glass plate 12, having a top side 13 which is the exposed side of the floor tile (i.e., the top of the floor upon which one would walk) and a backing substrate 14. A decorative layer 16 is disposed between the glass plate 12 and the backing substrate 14. In this embodiment, the decorative layer 16 is a decorative pattern 18 which has been painted or printed on the top surface 17 of the backing substrate 14. It should be appreciated that the decorative pattern is intended to encompass any pattern or design, including solid colors or a clear coating, which may cover all or only a portion of the top surface of the backing substrate. It should further be appreciated that the decorative pattern may alternatively be painted or printed on the bottom surface of the glass plate.

An adhesive 19 is disposed between the glass plate 12 and the backing substrate 14. The adhesive 19 may be applied to either the backing substrate 14 or the glass plate 12. If the adhesive 19 is applied to the backing substrate 14, it is preferably applied after the decorative pattern 18 has been painted or printed on the surface of the backing substrate. When the decorative pattern is painted or printed on the backing substrate, the adhesive 19 is preferably clear to avoid visually covering the decorative pattern 18. More preferably the adhesive 19 is part of the ink composition used to paint or print the decorative pattern 18. Once the adhesive 19 is disposed between the glass plate 12 and the backing substrate 14, the entire assembly is laminated using any lamination process known in the art.

The glass plate 12 may be either tempered glass or annealed glass. Tempered glass is preferred to enhance the impact resistance and resistance to breakage of the laminated glass floor tile. Tempered glass may be either heat tempered or chemically tempered. Heat tempered glass is made by rapidly cooling the outside of the glass after it is formed and allowing the inside to cool more slowly, thereby placing the inside in tension and the surface into compression. This results in a strong outer layer of glass that is resistant to breakage, as compared to annealed glass which is designed to break more easily. Chemical tempering may be accomplished by using an ion exchange process in which a larger ion replaces a smaller ion at the surface which causes expansion of the outer surface of the glass and places the interior into tension, thereby forming a strong outer surface. Heat tempering is preferred for economy, but chemical tempering is useful as well, for example, in preparing laminated glass tiles according to the present invention for use at the perimeter of a floor. The glass floor tiles used at the perimeter generally may need to be cut to conform to the perimeter, and chemically tempered glass tiles can be cut similarly to annealed glass tiles. Therefore, annealed or chemically tempered glass may be used as these are more easily cut than heat tempered glass.

The impact resistance of the glass plate can be further enhanced by increasing its thickness; however, this increases the cost of the glass. In addition, it is desirable to limit the depth of view for esthetic purposes. For both of these reasons, it is preferable to use a glass plate that is as thin as possible. The minimum thickness of the glass plate is determined based on the intended end use of the laminated glass floor tile in conjunction with the construction of the backing substrate, which can be designed to absorb and/or dissipate the force of any impact on the glass plate. The dimensions of the glass plate (length×width×thickness) may range from approximately 2"×2"×0.08" to 72"×72"×0.5", preferably from 4"×4"×0.1" to 24"×24"×0.25" and most preferably from 8.75"×8.75"×0.188" to 11.75"×11.75"×0.25".

The backing substrate 14 may be any suitable material that provides the appropriate potential for energy adsorption and/or dissipation, as dictated by the intended end use of the laminated glass floor tile. If substantial resistance to breakage is desired, then it is desirable to have a backing substrate that provides significant energy absorption and dissipation from impacts that may be suffered by the tile. In addition, the backing substrate must be capable of laminating to glass with an appropriate adhesive to avoid delamination. Furthermore, it should be appreciated that the geometry or size, the modulus and the coefficients of expansion and contraction should be considered in the selection of the materials used in the backing substrate. These coefficients, relative to the glass plate and the decorative layer, are indicative of whether certain layers will shrink during or after lamination causing residual stresses which may cause the tile to bow and warp.

Preferably, the backing substrate 14 is made of a plastic material and, more preferably, a plasticized polyvinyl chloride (PVC) homopolymer, polyethylene-vinyl acetate (EVA) copolymer or polyvinylbutyral (PVB). However, other materials may be used for the backing substrate including inorganic materials such as metal, for example, steel, aluminum and ceramics. It should be appreciated that the backing substrate 14 may be a single layer or a composite of several layers. Therefore, the backing substrate 14 may be a layered structure of any of these components, or combinations thereof, with or without filler. It should be appreciated that a highly filled polymer material may have sufficient creep compliance allowing it to bend, thereby allowing the laminated glass floor tile to be more resilient and adaptable to uneven or irregular subflooring. The particular materials used and the order in which the layers are positioned are determined based upon the various properties of these materials and the intended end use of the laminated glass floor tile as previously described. The dimensions of the backing substrate (length×width×thickness) may range from approximately 2.25"×2.25"×0.05" to 72.25"×72.25"×1," preferably from 4.25"×4.25"×0.08" to 24.25"×24.25"×0.25," and most preferably from 9"×9"0.1" to 12"×12"×0.2".

One example of a backing substrate, or one layer of a composite or multi-layered backing substrate, is a vinyl composition tile (VCT) which is composed of predominantly calcium carbonate with approximately 15%, by weight, binder or resin. The binder is a PVC copolymer or homopolymer, ethylene copolymer or the like, with or without plasticizers and thermal stabilizers. VCT provides beneficial properties such as resilience, so that the laminated glass floor tile will more easily conform to minor subfloor irregularities, good adhesion to conventional flooring materials using conventional adhesives, and low cost. Furthermore, VCT provides good energy absorption and dissipation, thereby making the tile more impact resistant.

As noted above and as shown in FIG. 1A, the decorative layer 18 is a layer of ink painted or printed on the backing substrate 14. Any process known in the art for painting or printing may be used, such as gravure printing. It is preferable that the printing is performed before the adhesive layer is applied and before the tile is laminated. More preferably, it is desirable to have the adhesive incorporated into the ink used in printing, as mentioned above. It should be appreciated that either the backing substrate or the glass plate may be printed. It should further be appreciated that the decorative layer, and the adhesive, may not cover the entire surface upon which it is printed, as the decorative pattern may only require ink in certain places on the surface.

The adhesive 19 is disposed between the glass plate 12 and the backing substrate 14 to insure binding of the glass plate 12 to the backing substrate 14 during lamination. As noted, the adhesive 19 may be applied to the appropriate side of either the glass plate 12, the backing substrate 14 or both. Preferably, the adhesive 19 is integral to the ink vehicle used to paint or print the decorative pattern on the backing substrate 14. This allows the ink to serve two purposes (decorative and adhesive) and eliminates the step of having to apply an adhesive separately to the glass plate or the backing substrate. Depending upon the decorative pattern used, however, an adhesive may still be disposed over a portion or entire surface of the backing substrate if the decorative pattern is formed by multiple passes of printing with various colors, as is common for color printing designs.

The adhesive 19 must be capable of binding to both the glass plate 12 and the backing substrate 14 to insure adhesion of the backing substrate 14 to the glass plate 12 and to prevent delamination over time. Furthermore, the adhesive 19 must form a bond between the glass plate 12 and the backing substrate 14 that does not weaken or cause delamination when exposed to water and other elements to which flooring is commonly exposed. U.S. Pat. No. 5,593,786 to Parker et. al. and U.S. Pat. No. 5,756,617 to Park et. al., which are hereby incorporated by reference, describes various adhesives useful in the lamination of glass to particular types of materials.

With respect to binding to the glass plate 12, the adhesive 19 may bind directly to the glass plate 12 or the adhesive may require the incorporation of a coupling agent. Adhesives that bind directly with glass include polymers, preferably copolymers, that have either hydroxyl groups, carboxylic acid groups or silanol groups, which react directly with the glass surface. Specific copolymers that may be used include PVC copolymers, PVB, urethane, vinyl formal, vinyl butyral, vinyl chloride, acrylic, vinyl acetate, maleic acid and anhydride groups and vinyl containing silane. One of skill in the art will appreciate that other types of polymeric adhesives may be used. Another adhesive that binds directly to the glass is an organosilane which may be simply wiped, sprayed ro dip coated onto the glass surface. If the composition of the backing substrate has the appropriate functional groups, preferably polymeric groups such as those provided by PVB, the organosilane will act to bind those functional groups to the glass surface. Specifically, the organo portion of the organosilane reacts with the polymer portion of the backing substrate and the silane portion reacts with the glass. U.S. Pat. No. 5,641,845 to Park, et. al., which is hereby incorporated by reference, and the aforementioned U.S. Pat. No. 5,593,786 to Parker, et. al., describe the use of an organosilane for binding certain polymeric groups to glass.

Adhesives that do not bind directly with the glass are also preferably polymeric, and the coupling agent is preferably an organosilane, wherein the organo portion reacts with the polymeric adhesive and the silane portion reacts with the glass. As mentioned above, U.S. Pat. Nos. 5,756,617, 5,641,845 and 5,593,786 describe the use of adhesives coupled with an organosilane. It should be appreciated that prehydrolysis of the organosilane to silanol monomer, silanol dimer, silanol oligomer and mixtures thereof is preferred to enhance the strength of the binding. Specifically, prehydrolyzed organosilanes such as aminoethylaminopropyl trimethoxysilane or styrylaminosilane are preferred. In addition, a mercapto-silane may be used.

Binding of the adhesive 19 to the backing substrate 14 depends upon the composition of the backing substrate. For a backing substrate that is primarily plastic, an appropriate polymeric adhesive will bind adequately. For a high modulus material, such as metals, ceramics and composites, such as fiber reinforced composite, fiber glass mattes or prepregs (e.g., epoxy glass prepreg), a high modulus adhesive may be used, such as a thermosetting adhesive, a thermoplastic adhesive or a UV or electron-beam curable adhesive.

Generally, it should be appreciated that many different adhesives may be used, depending upon the materials used for the backing substrate. Also, such adhesives may be selected based upon the coefficients of expansion and contraction of the backing substrate relative to the glass plate. For example, where the difference is large and the laminated glass tile is expected to bow or warp, it may be possible to use a UV or electron-beam curable adhesive to avoid heating and cooling of the laminate. It should also be appreciated that the backing substrate itself may be of an appropriate material such that it alone is capable of binding to the glass plate without the use of an adhesive. For example, VCT contains binder which may adequately bind to the glass plate through the use of an organosilane, as previously described. In addition, a backing substrate made of PVB may adequately bind to the glass plate.

Figure 2:
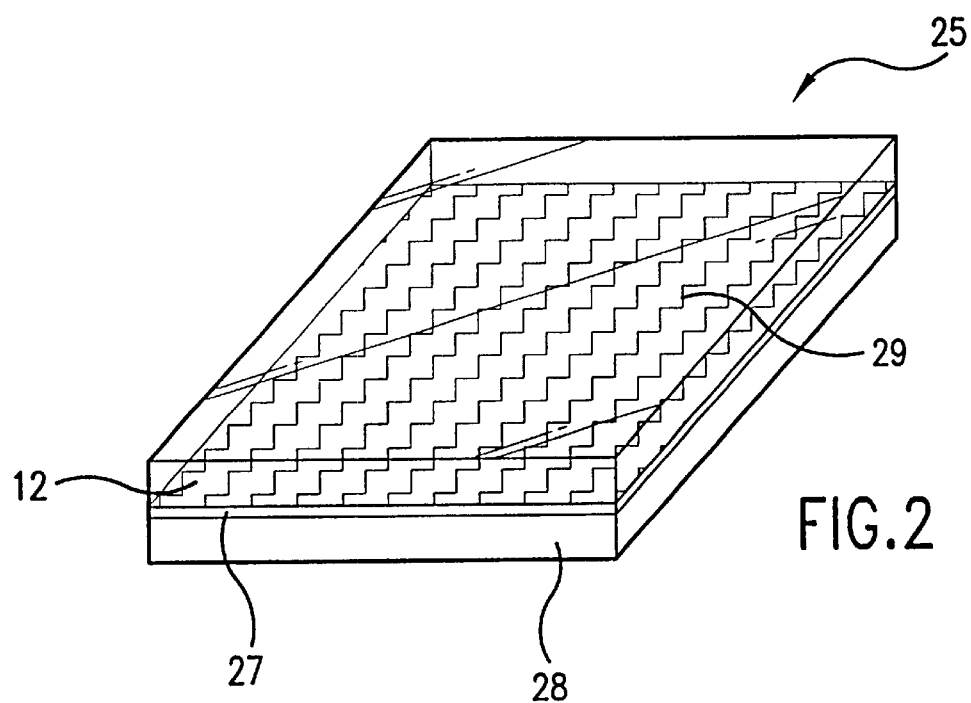
FIGS. 2 and 2A are a perspective view of another embodiment of a laminated glass floor tile according to the present invention.

FIG. 2 shows a preferred embodiment of a laminated glass floor tile 25 according to the present invention. Laminated glass floor tile 25 comprises a glass plate 12, a backing substrate 28 and a decorative layer 27. The glass plate 12 is the same as that previously described in connection with FIGS. 1 and 1A. The backing substrate 28 is also similar to the backing substrate 14 described in connection with FIGS. 1 and 1A. In this embodiment, however, the decorative layer is not painted or printed on the backing substrate or the glass plate. In this embodiment, the decorative layer 27 is a film placed between the glass plate 12 and the backing substrate 28. The decorative layer 27 has a decorative pattern 29 disposed on it, which is visible through the glass plate 12.

The decorative layer 27 may be any material including, for example, one or more polymeric materials, textiles such as cloth or nonwoven materials, paper, wood and wood particles, wood veneers, stone and stone particles, metal and metal particles, printed films, or any other decorative materials. The decorative layer 27 may also be made of multiple layers of any of these materials. The decorative layer 27 must be bound on one side to the glass plate 12, through the use of an adhesive (not shown) and on the other side to the backing substrate 28. Preferably, the decorative layer 27 is made of a polymeric material such that the adhesives previously described may be used to bind the decorative layer 27 to both the glass plate 12 and the backing substrate 28.

Specifically, the decorative layer 27 may be a PVC homopolymer with a decorative pattern 29 printed on it. In this case, an organosilane may be wiped or sprayed onto the glass plate 26 to achieve adequate bonding with the glass plate 12. The preferred adhesive in this embodiment is a calendered or extruded film which is placed between the glass plate and decorative layer. During lamination, this adhesive film liquifies and flows over the surface of the glass and the decorative layer to provide adequate adhesion. Additionally, or in the alternative, the decorative pattern inherent to the decorative layer 27 may contain the adhesive as part of the ink vehicle used in forming the decorative pattern 29.

Preferably, the decorative layer is bound to the backing substrate prior to its incorporation into the overall glass floor tile. For example, the decorative layer may be a polymeric film that is laminated to the backing substrate. This assembly is then further laminated to the glass plate. A preferred backing substrate is VCT, since the composition of the VCT aids in binding to a decorative layer.

Figure 2A:
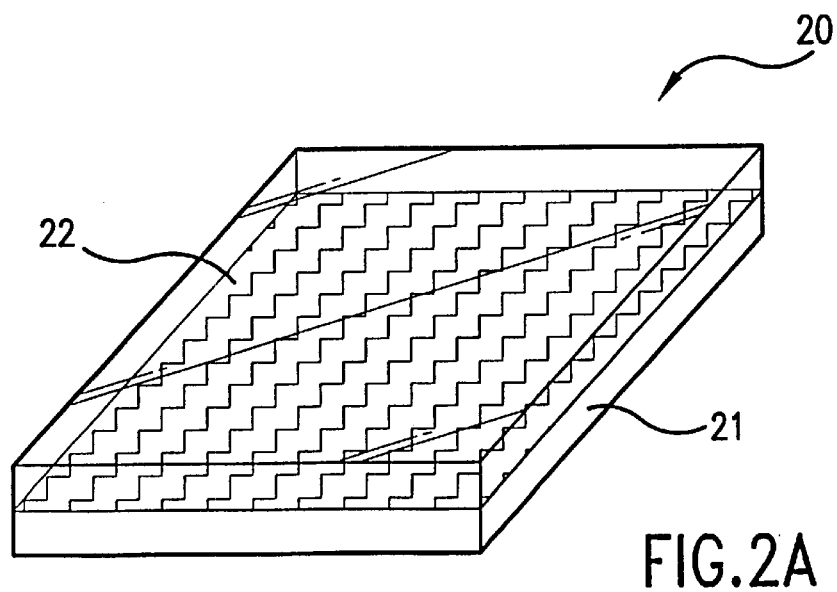

FIG. 2A shows another embodiment of a laminated glass floor tile according to the present invention. The laminated glass floor tile 20 comprises a glass plate 22 and a backing substrate 21. In this embodiment, the backing substrate 21 also provides a decorative pattern that is visible through the glass plate, thereby performing the function of both the backing substrate and the decorative layer. In addition, the backing substrate 21 provides the appropriate functional groups, such as PVB, to bind directly to the glass plate 22, with or without the use of a coupling agent.

Figure 3:
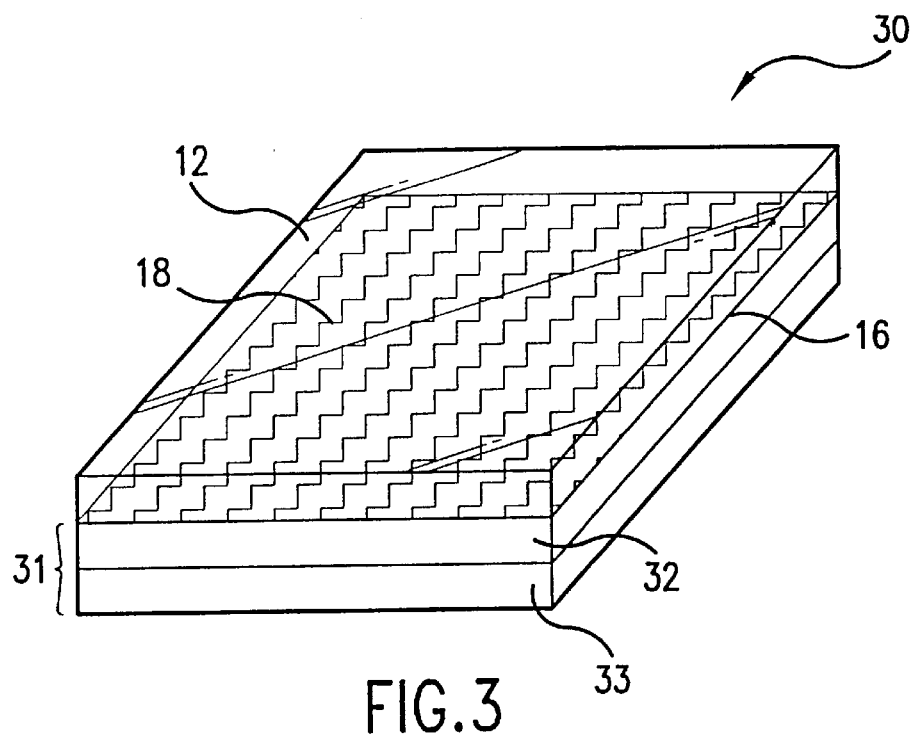
FIG. 3 is a perspective view of yet another embodiment of a laminated glass floor tile according to the present invention.

FIG. 3 shows another embodiment of a laminated glass floor tile 30 according to the present invention. The laminated glass floor tile 30 comprises a glass plate 12, as previously described, a decorative layer 16 and a backing substrate 31 which comprises two layers 32, 33. This laminated glass floor tile 30 is an example of a tile having a composite or multi-layered backing substrate. The glass plate 12 is the same as previously described. Also, the decorative layer 16 may be painted or printed on the top layer 32 of the composite backing substrate 31 or on the bottom of the glass plate 12 forming a decorative pattern 18. Alternatively, the decorative layer may be a separate film bearing a decorative pattern 18 as previously described in connection with FIG. 2. An adhesive (not shown) is used in laminating the glass plate 12 to either the backing substrate 31 or the decorative layer comprising a film. The layers 32, 33 comprising the backing substrate 31 may be any of the materials previously described. Preferably, the layers 32, 33 comprising the backing substrate 31 are laminated prior to lamination with the glass plate 12. An adhesive is used in laminating these layers 32, 33 together. The adhesive is selected based upon the composition of these layers 32, 33. The entire backing substrate 31 is then laminated to the glass plate as previously described with the decorative layer 16, or a decorative layer comprising a separate film, disposed therebetween. The dimensions of each of the layers comprising the backing substrate (length×width×thickness) may range from 2.25"×2.25"×0.05" to 72.25"×72.25"×1," preferably from 4.25"×4.25"×0.08" to 24.25"×24.25"×0.25," and most preferably from 9"×9"×0.1" to 12"×12"×0.2".

Figure 3A:
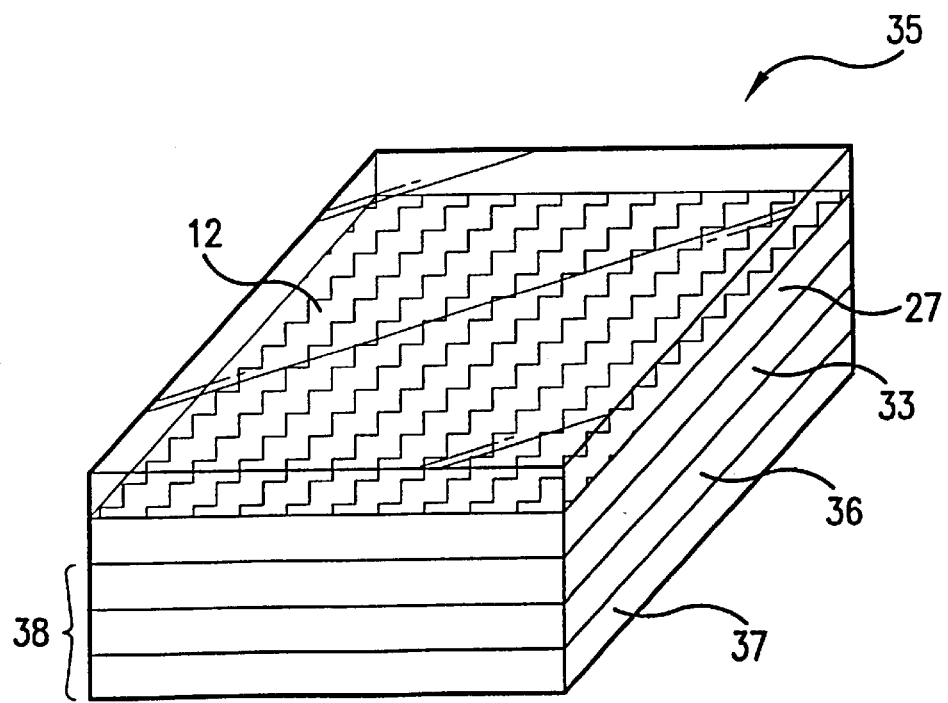
FIGS. 3A and 3B are a perspective view of yet another embodiment of a laminated glass floor tile according to the present invention.

FIG. 3A shows still another embodiment of a laminated glass floor tile 35 according to the present invention. The laminated glass floor tile 35 comprises a glass plate 12, a decorative layer 27, and a multi-layered backing substrate 38, which itself comprises a tile layer 33, an energy adsorbing layer 36 and another tile layer 37. The glass plate 12 and the decorative layer 27 are the same as previously described. The tile layers 33, 37 may be made of any of the materials described previously for use as a backing substrate. The purpose of the energy absorbing layer 36 is to provide an energy adsorbing layer to further improve the impact resistance of the laminated glass floor tile 35. The energy absorbing layer 36 is primarily a polymeric material such as PVC, EVA, and/or PVB, with a sufficient plasticizer level to impart a glass transition temperature which is at least equal to the temperature at which maximum impact resistance is desired. It should be appreciated that the thickness, elasticity, and loss modulus characteristics of this energy absorbing layer 36 can be adjusted to alter the entire laminated glass floor tile's impact resistance. Further, it should be appreciated that PVB may be inherently energy absorbing. It should also be appreciated that the energy absorbing layer may itself be a composite of any of the materials described for use as the energy absorbing layer or as a backing substrate.

Figure 3B:
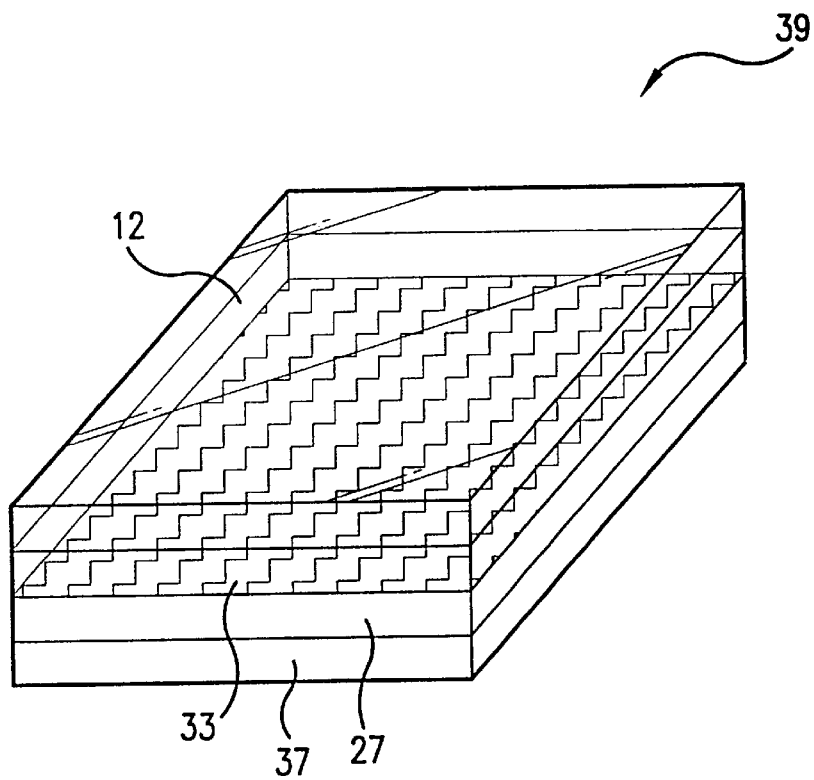

FIG. 3B shows another embodiment of a laminated glass floor tile according to the present invention which utilizes a composite backing substrate. Laminated glass floor tile 39 comprises a glass plate 12 and two tile layers 33, 37 which are located on both sides of the decorative layer 27. The tile layers 33, 37 in this case may be thermoplastic PVC, and the top tile layer 33, or both, may be transparent.

Figure 4:
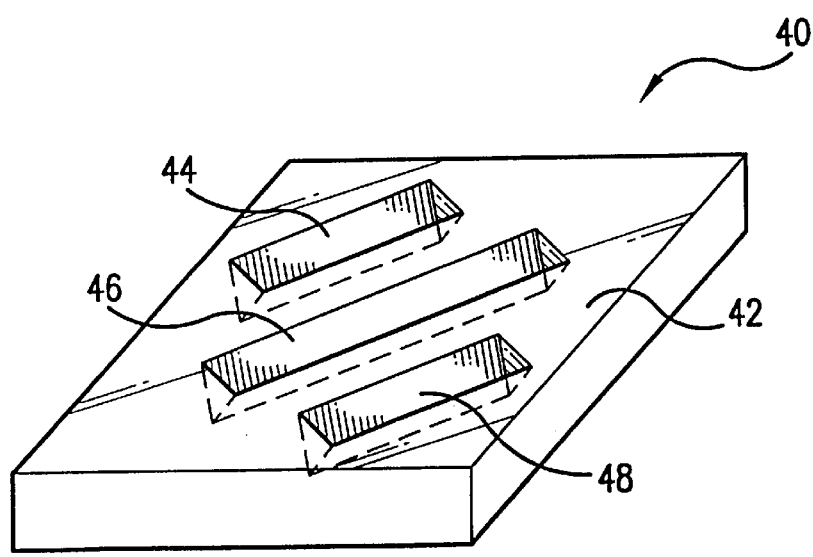
FIG. 4 is a perspective view of a portion of another embodiment of a laminated glass floor tile according to the present invention.

FIG. 4 shows another embodiment of a glass floor tile 40 according to the present invention. The glass floor tile 40 comprises a glass plate 42 and a backing substrate (not shown) similar to the other embodiments described previously. In this embodiment the glass plate 42 has been texturized to form etchings 44, 46, and 48. It should be appreciated that any design or pattern of etching may be used, as well as any number of etchings. Further, it is intended that texturizing includes embossing.

The purpose of texturizing the glass surface is to reduce the size of scratches, to visually hide existing scratches, and to provide an esthetically pleasing glass surface. Scratches occur when an object impacts or abrades the glass and causes a rupture along the surface of the glass. This rupture essentially propagates through the glass along a mean free path. By texturizing the glass, the mean free path of the scratch is interrupted thereby reducing the size of the scratch. Texturizing also causes light to be reflected from the glass plate surface in different directions thereby essentially hiding any existing scratches from view. Texturizing may also be used simply for decorative purposes. Various patterns, sizes, and depths of texture in the glass surface may be used to create different esthetic effects while providing the benefits described above. It should be appreciated that any method known in the art for texturizing glass may be used, such as etching, sandblasting, or mechanical embossing. It is preferred that texturizing be performed before the glass plate 42 is tempered and laminated to the backing substrate. This allows the maximum strength of the tempered glass to be realized.

It should be appreciated that the surface of the glass that is texturized may also be turned towards the decorative layer and backing substrate to control the light to and from the decorative pattern. This provides a different visual effect based on the differences in the refractive index between the layers or what is known as a lens effect.

It should be appreciated that other methods for improving the scratch resistance of the glass surface may be used including incorporating alumina into the glass formulation or applying a protective coating to the glass surface such as aluminosilicate or a plasma, preferably a diamond-like plasma coating, an alumino-silicate plasma, a borosilicate, or a carbide plasma material. These methods can easily be used in conjunction with the present invention.

Figure 5:
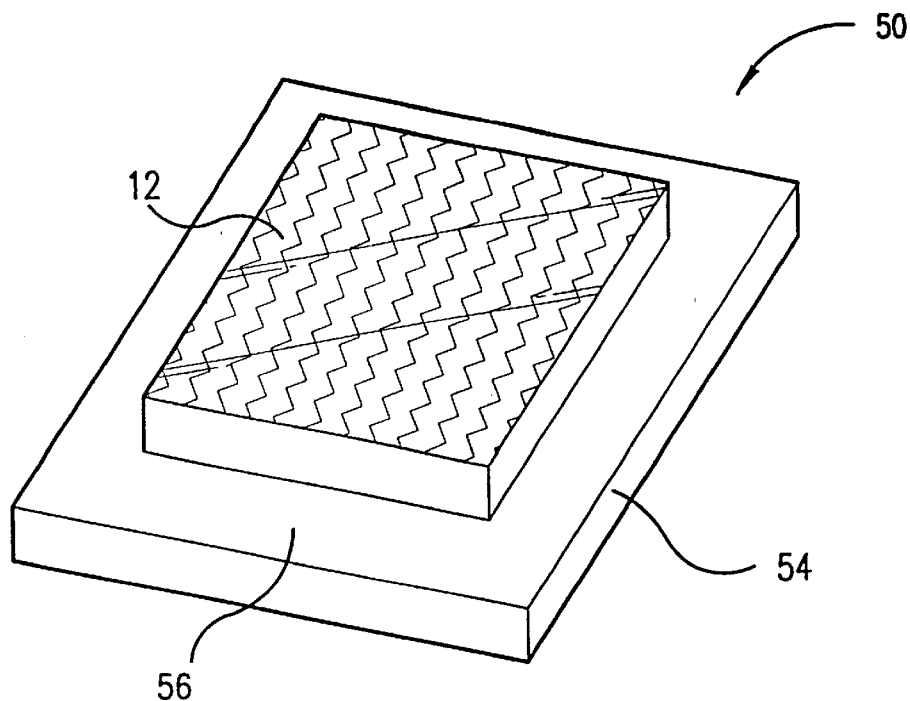
FIG. 5 is a perspective view of another embodiment of a laminated glass floor tile according to the present invention.

FIG. 5 shows yet another embodiment of a laminated glass floor tile 50 according to the present invention. The laminated glass floor tile 50 comprises a glass plate 12 and a backing substrate 54. The glass plate 12 is similar to the glass plates previously described. The backing substrate 54, however, is designed to extend beyond the perimeter of the edges of the glass plate 12, such that a perimeter portion of the top surface 56 of the backing substrate 54 is exposed. This allows for easier construction of an entire floor (described below) using the laminated glass floor tiles 50 and provides added protection against chipping of the edges of the laminated glass floor tile 50 during handling and installation. It should be appreciated that any of the laminated glass floor tiles of the present invention may be constructed such that the glass plate exposes a perimeter surface of an underlying layer.

Figure 6:
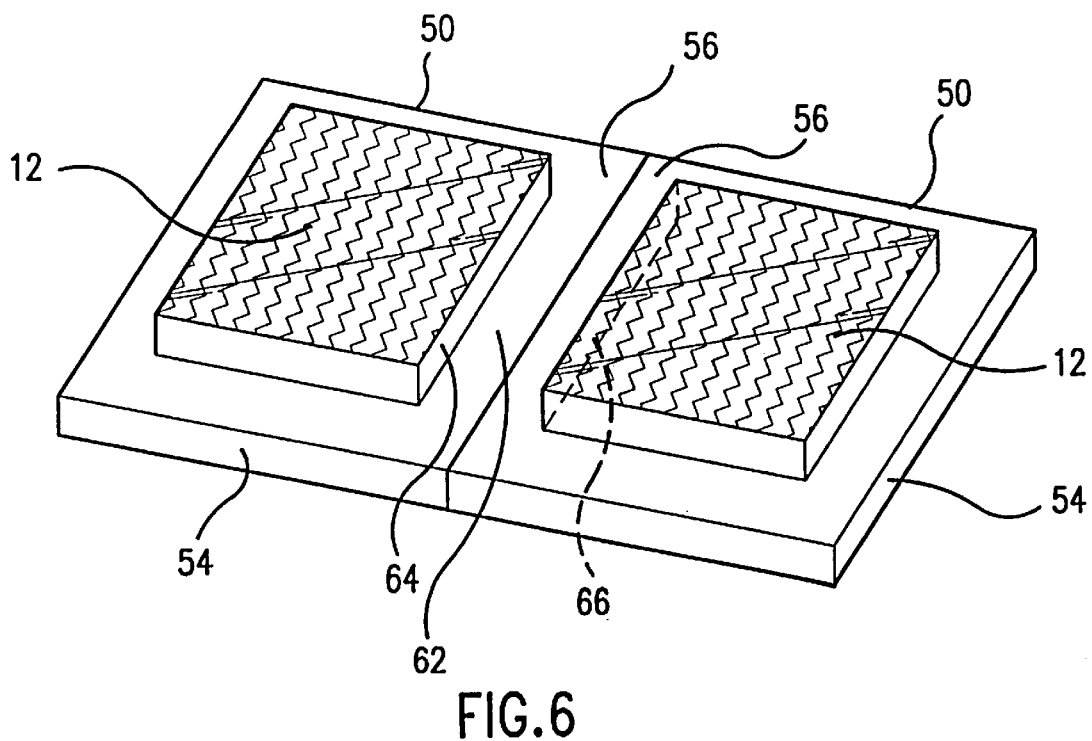
FIG. 6 is a perspective view of two of the laminated glass floor tiles of FIG. 5.

FIG. 6 shows the cooperation between two of the laminated glass floor tiles 50 when placed next to each other as they would be in constructing a floor. By placing the laminated glass floor tiles 50 next to each other, the exposed top surface 56 of the backing substrate 54 creates the bottom of a channel 62 formed between the side walls 64 and 66 of each of the glass plates 12. One of skill in the art can appreciate that these channels are formed about each side of each glass plate 52 as laminated glass floor tiles 50 are laid next to each other. The purpose of this channel 62 is to receive a resilient or rigid adhesive or grout to hold the laminated glass floor tiles 50 in place. It should be appreciated that the dimensions of the channel 62 can be adjusted as necessary for either structural integrity or esthetic purposes. As mentioned, any of the laminated glass floor tiles of the present invention may be constructed to provide for such a channel.

Figure 7:
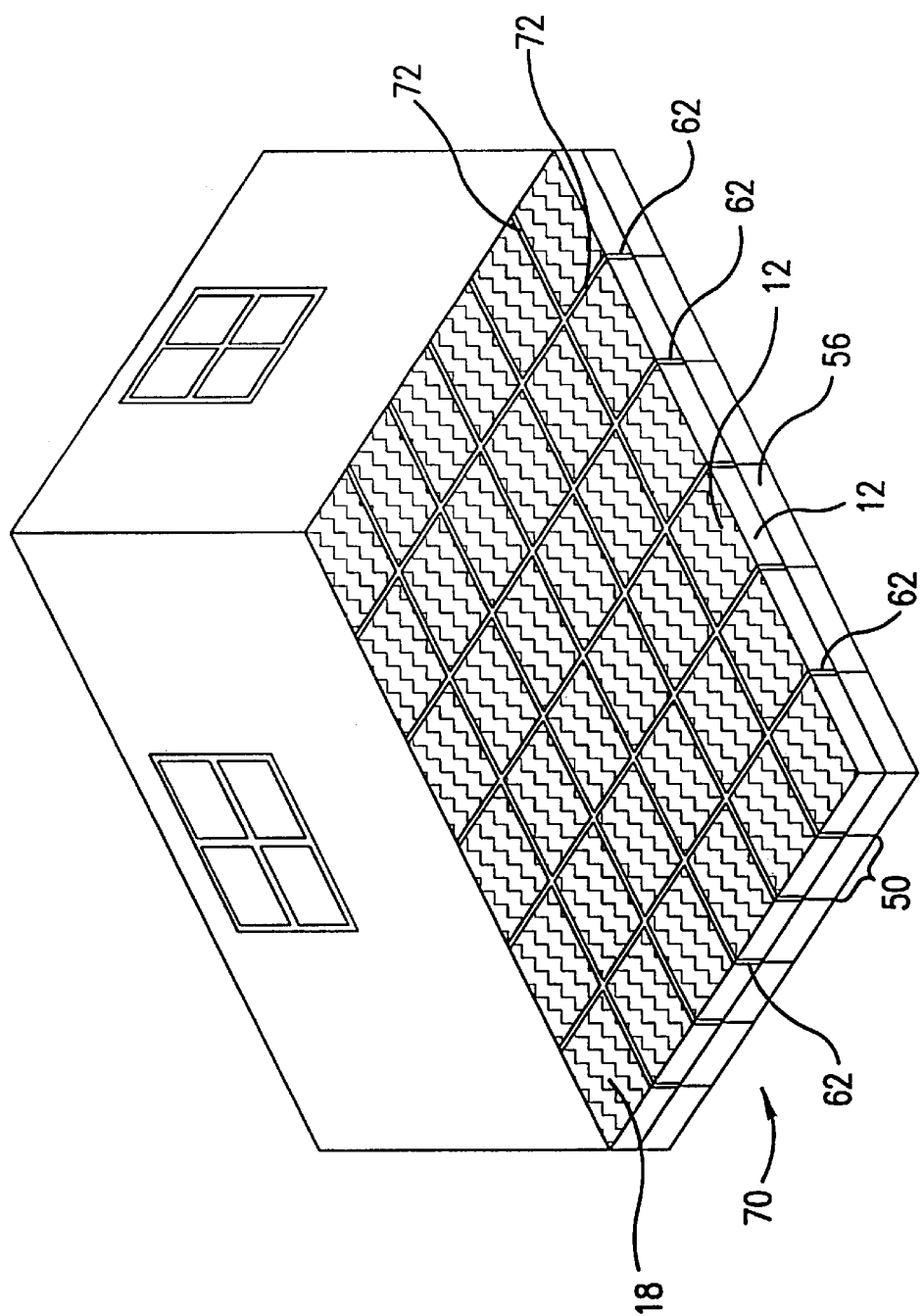
FIG. 7 is a perspective view of a floor constructed using laminated glass floor tiles according to the present invention.

FIG. 7 shows a perspective view of a flooring 70 constructed using laminated glass floor tiles 50. As shown, the decorative pattern 18 is visible through the glass plates 12. The channels 62 are filled with a resilient or rigid adhesive or grout 72 to hold the glass floor tiles 50 in place.

One advantage of the laminated glass floor tiles of the present invention is that they can be affixed to a subfloor, such as wood in residential applications, where expansion and contraction are more extreme. In addition, the laminated glass floor tiles of the present invention are stronger than traditional ceramic or marble tile. This strength may contribute to the overall strength of the floor itself and also enables the use of a resilient adhesive grout between the tiles, as opposed to a more rigid adhesive. In addition, the higher flex strength of tempered glass, compared to traditional ceramic or marble tiles, enables its use on subfloors with less dimensional stability, since it is less prone to crack under dynamic or static loads commonly experienced by floors in residential applications. In these cases where the subfloor may flex, a resilient adhesive or grout is preferred. A resilient adhesive or grout is preferably a polymeric grout having functionality sufficient to provide durable adhesion to the glass plate 12. Such resilient adhesive or grout also preferably has resilience sufficient to dissipate the stresses of expansion and contraction of the various sub-floor members upon which the flooring rests.

Rigid grout is preferably a non-sanded type of cementitious material, with or without polymer modifications, as is typically used for marble flooring materials. However, if a traditional rigid grout is used, the tiles must be affixed to a subfloor via methods that minimize expansion and contraction, such as mortor board, concrete, etc.; otherwise the grout may crack.

It should be appreciated, however, that a flooring may be constructed using any of the laminated glass floor tiles of the present invention, either with or without the exposed perimeter of an underlying layer as described in connection with FIG. 5. If the laminated glass floor tiles do not have such an exposed perimeter area, then a conventional adhesive may be used. For example, if the backing substrate is a PVC composition tile, then a conventional adhesive for PVC tile could be used. In either case, flooring adhesives commonly used in the flooring industry can be used to adhere the laminated glass floor tiles of the present invention to various subfloors or on top of existing flooring materials such as linoleum.

It may be preferable to use a laminated glass floor tile comprising annealed glass or chemically tempered glass for the perimeter of the flooring. Although heat tempered glass itself is difficult to cut, a laminated annealed glass or chemically tempered glass may be cut using methods well known to one of skill in the art, thereby allowing for easier installation about the perimeter of the floor including both the outer and inner boundaries of the flooring (e.g., where the flooring surrounds a given structure such as a kitchen island). The laminate used with the annealed glass does not have to be of the same construction as that used with the tempered glass; however, it would be important for both tiles to have the same thickness to make the floor even.

It should be appreciated that any cleaning or protective treatment used for glass in other applications can be used on the laminated glass floor tiles and flooring of the present invention. For example, glass cleaning solutions used to clean window glass may be used to clean a flooring constructed of glass floor tiles of the present invention. Glass surface treatments such as titanium dioxide may also be used. Titanium dioxide acts to absorb ultraviolet light which in turn acts to degrade organic material residing on the glass. Once degraded, this organic material is more easily removed from the glass surface as it does not adhere as well to the glass surface.

Figure 7A:
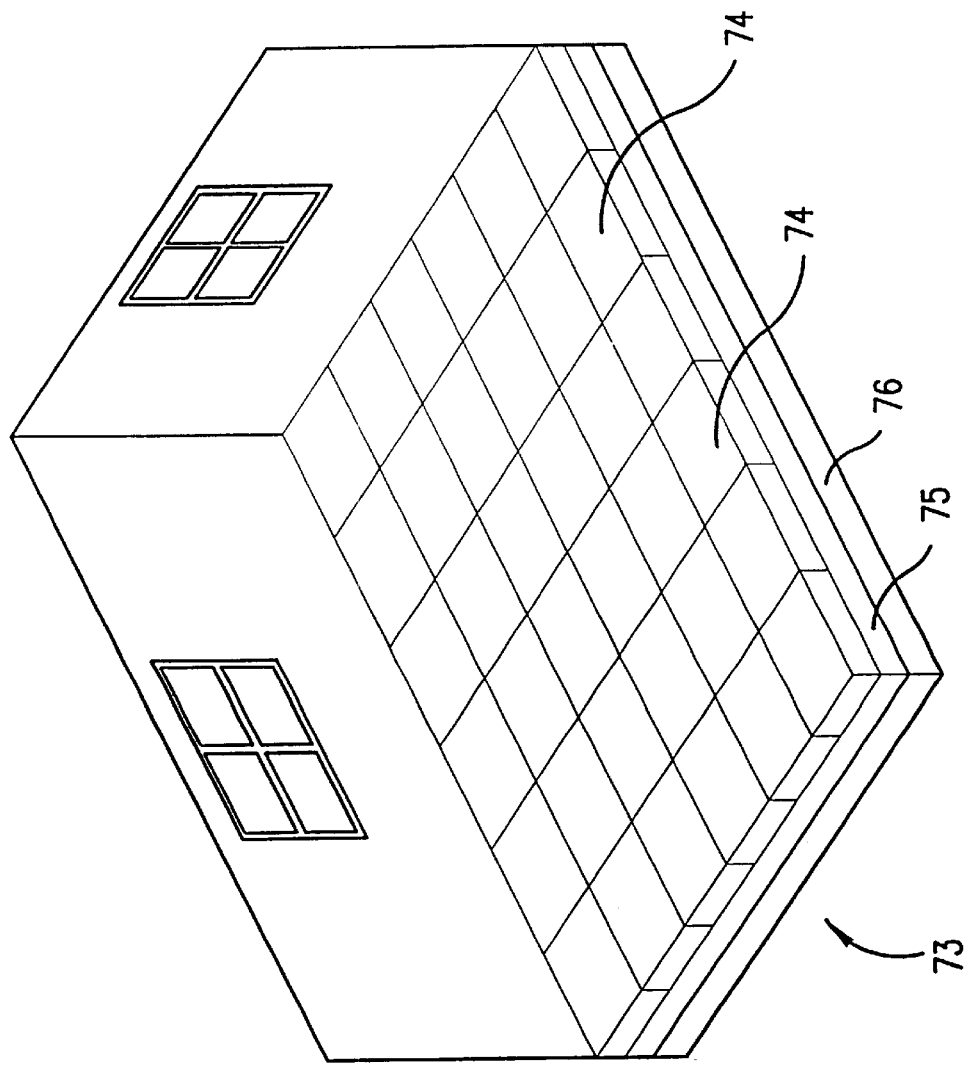
FIG. 7A is a perspective view of another embodiment of a floor constructed using laminated glass floor tiles according to the present invention.

FIG. 7A shows a perspective view of preferred embodiment of a flooring made using any of the glass floor tiles of the present invention. A glass flooring 73 comprises a plurality of laminated glass floor tiles 74 made according to the present invention. It should be appreciated that any of the laminated glass floor tiles of the present invention made by used in connection with the glass flooring 73. The laminated glass floor tiles 74 are adhered to a floating subfloor 75 which rests on top of the actual subfloor 76. The floating subfloor 75 may be any type of material to which the glass floor tiles 74 may be adhered.

It should be appreciated that the use of a floating subfloor assembly on top of the subfloor allows a flexible grout material to be used to dissipate the stress associated with either subfloor or tile movement. Unlike traditional hard-surface flooring materials, the strength of the tempered glass enables the use of a floating subfloor and flexible adhesive. Traditional ceramic and marble tiles would be susceptible to breakage under such static load, whereas the strength and flexibility of laminated tempered tiles and the relative flexibility of laminated annealed tiles enable these to be used in this manner. It should also be appreciated that the glass floor tiles may or may not be adhered to the floating subfloor.

Figure 7B:
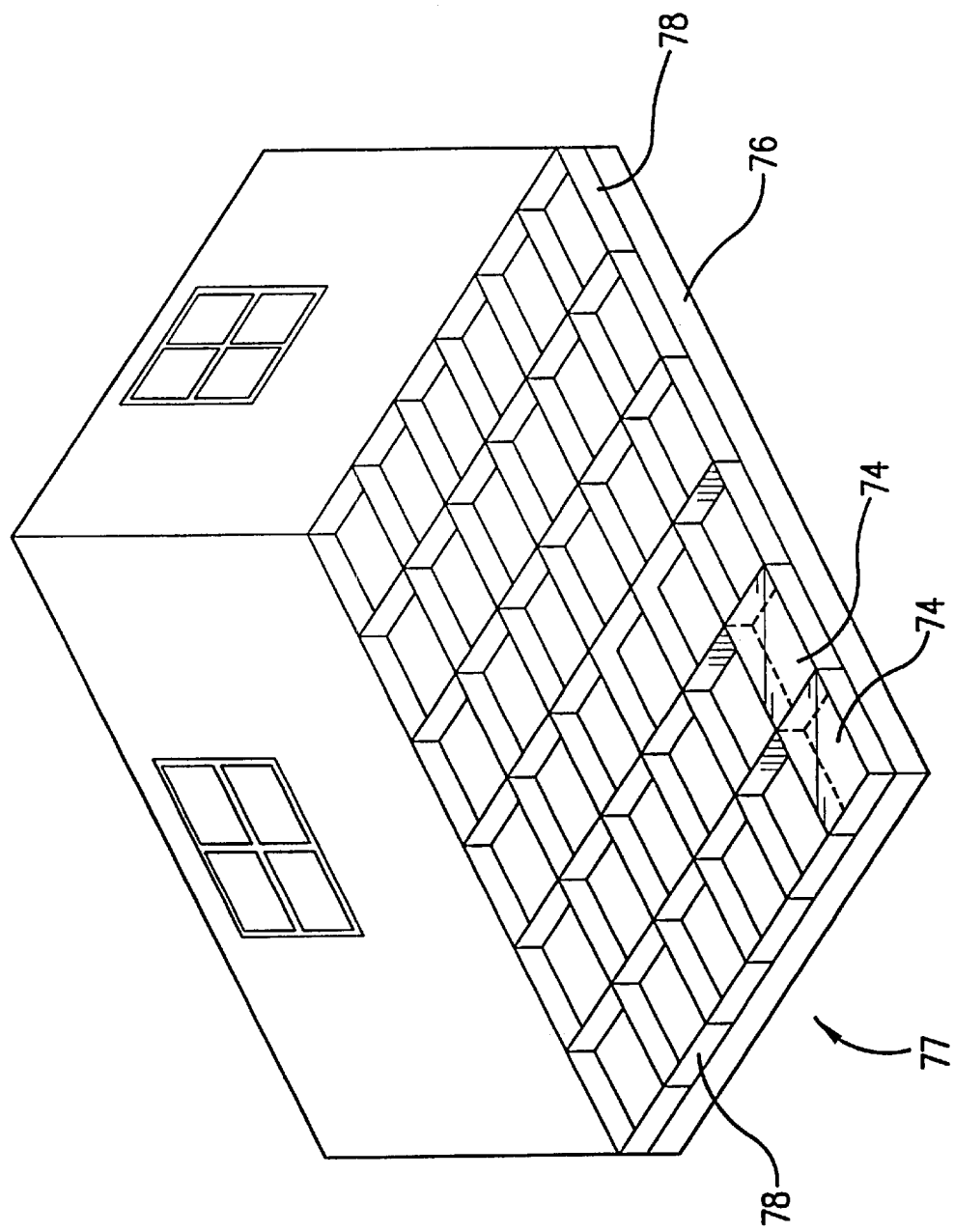
FIG. 7B is a perspective view of another embodiment of a flooring constructed using laminated glass floor tiles according to the present invention.

FIG. 7B is a perspective view of another embodiment of a flooring made using any of the laminated glass floor tiles of the present invention. A glass flooring 77 comprises a plurality of laminated glass floor tiles 74, which may be any of the laminated glass floor tiles of the present invention. In this embodiment, a grid 78 is positioned on the subfloor 76, and the laminated glass floor tiles 74 are placed within the grid 78. The use of a grid allows the laminated glass floor tiles to be used with an irregular or uneven subfloor. In addition, the use of a grid allows for ease of installation of the tiles themselves.

FIG. 8 shows a process schematic of a press lamination process for making a laminated glass floor tile according to the present invention which has a separate decorative layer disposed between the glass plate and the backing substrate, for example, as described in connection with FIG. 2A. In the first step 81, silane is applied to one side of a glass plate to aid in adhesion to a decorative layer, for example, by applying 10% Z6032, prehydrolyzed. (Z6032 is a trade name for strylamino trimethoxy silane.). In the second step 82, the decorative layer, which already has the adhesive in the ink used in making a decorative pattern on the decorative layer, is mated to the glass plate. In the third step 83, this assembly is placed in a press and pressure is applied. Although one of skill in the art will recognize that conditions may be altered depending upon the materials used for the decorative layer and for the adhesive, a representative set of conditions includes pressing this assembly at approximately 600 psi and approximately 320° F. for approximately 12 minutes followed by cooling for approximately 10 minutes to a temperature of approximately 100° F. The press is then opened and in the fourth step 84, an adhesive is applied to the backing substrate or to the exposed side of the decorative layer and the backing substrate is mated to this exposed side of the decorative layer. This assembly is then pressed in the fifth step 85 at approximately 400 psi and approximately 200° F. for approximately 3 minutes. The assembly is then cooled for approximately 5 minutes. One of skill in the art will recognize again that these conditions may be altered depending upon the materials used for the backing substrate and adhesive between the backing substrate and the decorative layer. If desired, the edges of the backing substrate and other layers of the final laminated tile may be ground to produce a more square tile.

It should be appreciated that additional press steps may be used depending upon the materials of the layers within the laminated tile. Specifically, the number of press cycles depends on the melt/flow process characteristics of the polymeric components to be laminated. For example, a decorative layer comprising printed PVC homopolymer and a silane adhesive layer may require a higher temperature during pressing than a vinyl composition tile to get sufficient flow to force the air from the center of the laminate to the edges to minimize air bubble entrapment and to achieve a satisfactory chemical bond between the polymer and the glass for end use performance. Therefore, the number of press cycles depends on the physical characteristics of the materials used for each layer within the tile.

It should be also appreciated that the press used can be a multi-cavity press to laminate multiple samples, and can be followed by subsequent presses in a semi-continuous process to laminate various layers under different conditions as required by the melt/flow-process characteristics of the different polymeric layers.

Figure 9:
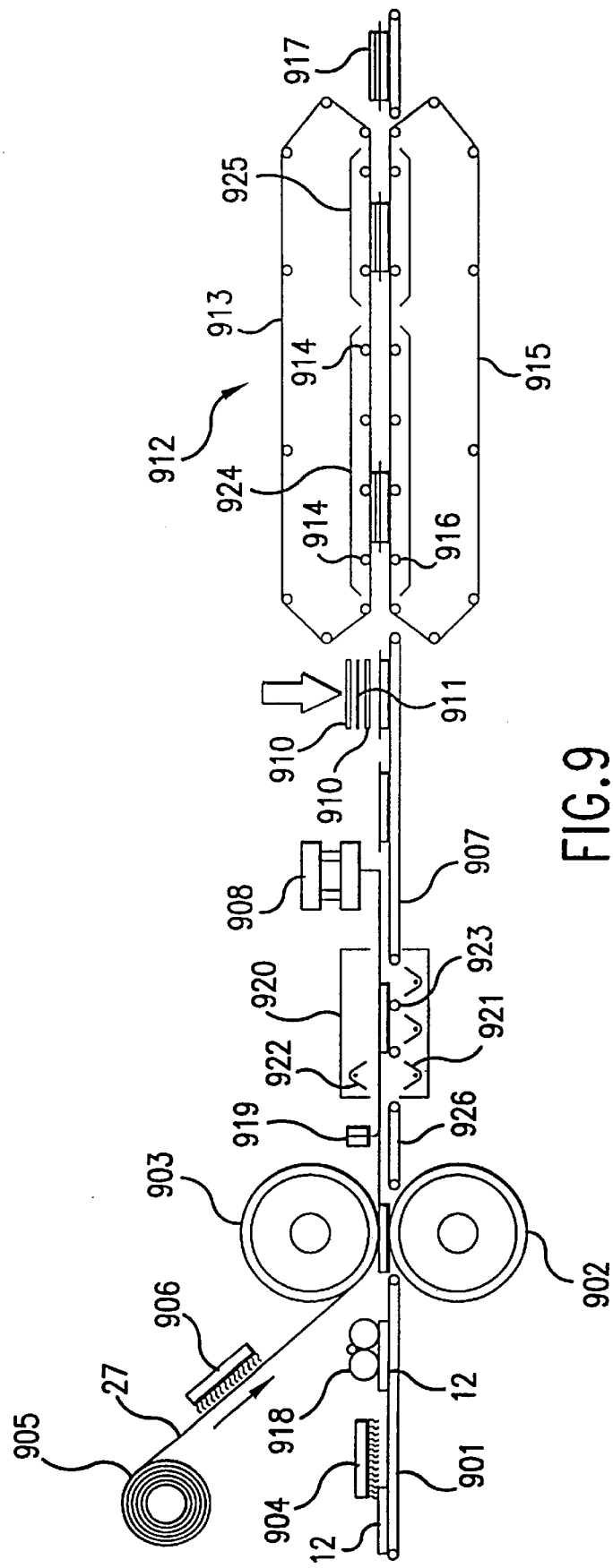
FIG. 9 is a elevational view of a continuous lamination process for making a laminated glass floor tile according to the present invention.

FIG. 9 shows a continuous lamination process for making a laminated glass floor tile according to the present invention which has multiple layers as described in connection with FIG. 3A. The glass plate 12 is placed on a first conveyor belt 901 which delivers the glass plate 12 to a roll coater 918 and subsequently to two steel nip rolls 902, 903 which are rubber coated. The roll coater 918 may be used to apply an adhesive coating to the surface of the glass plate 12, such as a UV curable adhesvie. It should be appreciated that a heater 904 may be used along the first conveyor belt 901 to preheat the glass plate 12 prior to its introduction to the roll coater 918 and the nip rolls 902, 903. A decorative layer 27 is also delivered to the steel nip rolls 902, 903 from a feed roll of the decorative layer 905. Similarly, a heater 906 may be used to preheat the decorative layer 27 prior to the nip rolls 902, 903. The glass plate 12 and the decorative layer 27 meet at the entrance to the nip rolls 902, 903 such that the decorative layer 27 is on top of the glass plate 12. Nip rolls 902, 903 then act to press the glass plate 12 and the decorative layer 27 together, thereby laminating the two layers. It should be appreciated that the nip rolls 902, 903 are heated to provide the desired temperature for lamination. Alternatively, a continuous belt press may be used in place of the nip rolls 902, 903.

The laminated assembly is then passed onto a second conveyor belt 926. The laminated assembly is passed by squeegie 919, which alternatively may be a nip roll, where the decorative layer 27 and the UV curable adhesive are smoothed onto the glass plate 12. If a UV curable adhesive is used, the laminated assembly is then passed through a UV curing unit 920 by rollers 923. The UV curing unit 920 contains arc lamps or microwave lamps 921, 922 in a reflector housing that emit high intensity UV light to cure the adhesive. The laminated assembly is then passed to a third conveyor belt 907 where cutter 908 acts to cut the decorative layer 27 between the glass plates 12 to provide separate laminated assemblies. Additional layers may then be added to the exposed side of the decorative layer 27, such as a backing substrate as well as additional layers such as a tile base and/or energy absorbing polymeric material. Therefore, it should be appreciated that any of the tiles of the present invention may be constructed using this process. Preferably, these additional layers have been previously laminated by a separate process, which may be similar to any of the lamination processes described herein. For example, and without limiting the scope of this invention, FIG. 9 shows a pre-laminated combination of a tile base 910, an energy absorbing polymeric material 911, and another tile base 910. This assembly is placed on top of the exposed side of the decorative layer 27. The entire assembly is then fed to a continuous belt press 912 which comprises a top belt 913 which is rotated using a series of nip rolls 914 and a bottom belt 915 which is also rotated using a series of nip rolls 916. The top and bottom belts 913, 915 and the top and bottom nip rolls 914, 916 act to laminate the additional layers to the decorative layer 27. It should be appreciated that the continuous belt press 912 may be divided into two parts, one to provide heating 924 and one to provide cooling 925. Heat is added to the continuous belt press 912 to provide the desired temperature for lamination, and the pressure applied between the top and bottom portions of the continuous belt press 912 is adjusted to supply the desired pressure for lamination. Cooling is used to cool the laminated tiles down. The final laminated glass floor tile 917 is then conveyed out of the continuous belt press 912. If desired, the edges of the backing substrate and other layers of the final laminated tile may be ground to produce a more square tile.

FIG. 10 shows a process schematic of an autoclave lamination process for making a laminated glass floor tile according to the present invention. Both tempered and annealed glass can be laminated by this process. An autoclave process provides the ability to batch laminate the tiles in one step. Moreover, an autoclave provides uniform pressure which allows for the pressing of materials with different melt flow characteristics. If a one step press process were used, extreme lateral flow would result from the material having the highest melt flow index (the copolymer vinyl composition tile in this case). This flow causes a loss in image clarity, since the PVC homopolymer film is also "stretched" by the lateral flow of the base beneath. This is not a problem in the autoclave process, where uniform pressure prevents these flow differentials. Also, under uniform pressure, multiple polymeric layers having different melt/flow characteristics can be simultaneously laminated in one batch step. In the first step 1001 all of the layers desired for the laminated glass floor tile are assembled. In the second step 1002 this assembly is pre-pressed utilizing the same continuous lamination process described in connection with FIG. 9. Alternatively, this second step 1002 may comprise placing the assembly in a sealed vacuum bag or in a bag to which a continuous vacuum is applied. In both instances, pre-pressing and the use of a vacuum bag are to minimize air bubbles within the laminate. In the third step 1003, the assembly is then placed in an autoclave and heated to approximately 300° F. at approximately 200 psi under pressure for approximately 15 minutes. One of skill in the art will appreciate that the conditions under which the autoclave is operated will vary with the specific materials used for the various layers of the tile. In the forth step 1004 the finished tile is removed from the autoclave.

FIG. 11 shows a template cavity 1100 that can be prepared for use in the second step 1002 of the autoclave lamination process or which can be used in the continuous lamination process of FIG. 9. The template cavity 1100 comprises a lower recess 1101 which is dimensioned to hold the glass plate as defined by the lower side walls 1103, 1104 and the bottom 1105. An upper recess 1102 is dimensioned to hold the additional layers laminated to the glass plate as defined by the upper side walls 1106, 1107 and the bottom shelves 1108 1109 which are approximately planar with the top of the glass plate when situated in the lower recess 1101. The template cavity 1100 provides for ease of assembly of all of the layers and eliminates the need for subsequent edge grinding of the polymeric base to get a more square tile. It should be appreciated that the template cavity must be made of a sufficiently rigid material to withstand the temperature and pressure in the autoclave and avoid flow of the tile material. The template cavity 1100 is preferred in making a tile as described in connection with FIG. 5.

The invention having been described, the following examples are presented to illustrate the present invention, rather than to limit the scope of the invention.

EXAMPLE 1

Table 1 shows the results from tests conducted to evaluate the impact resistance of various laminated glass floor tiles made according to the present invention compared to glass. The various constructions of the laminated glass floor tiles are described by giving each layer of the laminate from the top of the tile to the bottom. For example, a laminated glass floor tile having a 0.130" glass plate, a 0.002" PVC decorative layer, and a 0.060" vinyl composition tile (VCT) as the backing substrate is shown as: 0.130" glass/0.002" PVC film/0.060" VCT.

TABLE 1

| Construction | Thickness | Impact (support/fail) |
| --- | --- | --- |
| 0.130" glass | 0.130" | Fail |
| 0.130" glass/0.002" PVC film | 0.130" | Fail |
| 0.130" glass/0.002" PVC film/ 0.060" VCT | 0.192" | Support |
| 0.188" glass/0.002" PVC film | 0.190" | Fail |

Each laminated tile was prepared using a 12"×12" tempered glass plate which was wiped with a 25% solution of prehydrolyzed amino-ethyl-amino-propyl trimethoxy silane. Specifically, this silane was prepared by mixing Dow Coming Z6020, methanol and $H_2O$ at a ratio of 50/50/5, respectively, for four hours, and then diluting with methanol to a concentration of 25% prehydrolized silane by weight. The wiped glass plate was then press laminated to a decorative layer at 300° F. and 25 tons pressure for 3 minutes, followed by 3 minutes of cooling under pressure. The decorative layer was a 0.002" extruded PVC homopolymer film which was printed on one side with an overall decorative pattern. The decorative pattern was gravure printed using a pigment which incorporated as its base a VAGF adhesive (a solution vinyl resin available from Union Carbide). In a second step, the glass/PVC laminate was press laminated to a 0.060" vinyl composition tile (VCT), which comprises approximately 15% PVC copolymer binder and 85% calcium carbonate, at 230° F. and 25 tons pressure for 3 minutes, followed by 3 minutes of cooling under pressure.

The laminated structure was then subjected to the impact of a 0.5 kg cylindrical can dropped from a height of 4'. The results of these tests are qualitatively noted as Support ( the sample tile did not crack or break) and Fail (the sample tile did crack or break). The results show that the sample having the VCT backing supported the impact without breaking, whereas a free unlaminated pane of glass (tempered) shattered. Further, even the use of a thicker glass plate (0.188") without the VCT did not withstand the impact. Therefore, a laminated structure using a thinner tempered glass plate is more impact resistant than a glass plate of approximately the same thickness as the laminated structure. These results also indicate the importance of an energy absorption layer.

EXAMPLE 2

In a similar experimental fashion as that of Example 1, two 0.188" tempered glass plates were each wiped with a 5% Z6020 silane solution and then press laminated with a printed melamine saturated paper from Pioneer Plastics (0.004" thick) at 300° F. at 45 tons pressure for 10 minutes, followed by 7 minutes of cooling. In a second step, one was pressed with two layers of 0.080" VCT, while the second was pressed with layers of 0.030" Solutia (formerly Monsanto) Saflex PVB and 0.080" VCT at 200° F. and 25 tons pressure for 4 minutes, followed by 5 minutes of cooling. A 1.5 kg can was then dropped on each sample. The results are shown in Table 2.

TABLE 2

| Construction | Total Tile Thickness | Impact (support/fail) |
| --- | --- | --- |
| 0.188" tempered glass/ 0.004" melamine saturated print paper/ 0.080" VCT/0.080" VCT | 0.352" | Fail |

TABLE 2-continued

| Construction | Total Tile Thickness | Impact (support/fail) |
|---|---|---|
| 0.188" tempered glass/ 0.004" melamine saturated print paper/ 0.030" PVB/0.080" VCT | 0.302" | Support (also supported four additional drops) |

These results indicate that the impact resistance can be improved through the incorporation of an energy absorption layer such as PVB. It should be noted that PVB improves the impact resistance even though the overall thickness of the construction is decreased.

EXAMPLE 3

The following silane coupling agents were prepared as described on a weight basis. All of the silanes were, however, pre-hydrolyzed and diluted with methanol to the designated weight percent of active silane. In addition, a PVB adhesive was also prepared.

1) 5% Z6020. 50 parts Dow Corning amino-ethyl-amino-propyl trimethoxy silane, 50 parts methanol and 5 parts $H_2O$ were mixed, stirred overnight and then diluted to 5% silane.

2) 10% A1891. 50 parts Witco-Osi mercaptotrimethoxy silane, 50 parts methanol, 5 parts $H_2O$ and 1 part glacial acetic acid were mixed, stirred overnight and then diluted to 10% silane.

3) 10% Z6032. 100 parts Dow Coming stryryl amino trimethoxysilane, 25 parts $H_2O$ and 5 parts acetic acid were mixed, stirred overnight and then diluted to 10% silane.

4) 10% Z6040. 50 parts Dow Corning epoxy functional trimethoxysilane, 50 parts Methanol, 5 parts $H_2O$, 1 part acetic acid were mixed, stirred overnight and then diluted to 10% silane.

5) 10% PVB. Polyvinyl butyral (B76 PVB as received) was dissolved in ethanol.

Five 6"×6" annealed glass plates were each hand wiped with the above silanes and press laminated with a 0.002" extruded PVC film, as described in Example 1, at 290° F. and 18 tons pressure for 4 minutes, followed by 4 minutes of cooling. In some cases the VAGF side bearing the decorative pattern was towards the glass plate. In other cases the non-printed side (PVC homopolymer side) of the PVC film was towards the glass plate. Also, in separate cases, a melamine saturated paper, printed with an overall decorative pattern, was similarly laminated to the glass. Relative adhesion was then qualitatively gauged after pressing by attempting to hand peel the film away from the glass. If the film resisted peeling, the sample was then submerged in water for 48 hours. These samples were then inspected for edge delamination and bubbles and subjected again to the qualitative peel test. Films with low adhesion were easily peeled from the glass, whereas films with good adhesion offered resistance to peel. Table 3 presents the results of these tests. The "Interface" in Table 3 denotes whether the VAGF side, the PVC homopolymer side or melamine was laminated to the glass.

TABLE 3

| Adhesive | Interface | Adhesion After Pressing | Adhesion After $H_2O$ Submersion |
|---|---|---|---|
| 5% Z6020 | VAGF/glass | good | poor |
| 5% Z6020 | PVC/glass | poor | poor |
| 10% A1891 | VAGF/glass | poor | poor |
| 10% A1891 | PVC/glass | poor | poor |
| 10% Z6032 | VAGF/glass | good | poor |
| 10% Z6032 | PVC/glass | good | poor |
| 10% Z6040 | VAGF/glass | poor | poor |
| 10% Z6040 | PVC/glass | poor | poor |
| None | VAGF/glass | poor | poor |
| None | PVC/glass | poor | poor |
| 10% PVB | VAGF/glass | good | poor |
| 10% PVB | PVC/glass | poor | poor |
| None | melamine/glass | good | poor |
| 5% Z6020 | melamine/glass | good | good |

These results generally show that good adhesion was obtained with a variety of adhesives when the VAGF side of the decorative layer was towards the glass plate. Based upon the composition of VAGF, the decorative layer should be composed, therefore, of a polymer with adequate functionality to either bond directly with the glass or by use of a coupling agent such as PVB, Z6020 or Z6032. This also shows how the decorative layer may serve both as an adhesive and as decoration. In addition, these results show that Z6032, unlike Z6020, is a good silane for adhering both the PVC homopolymer and VAGF (PVC copolymer) to glass.

VAGF and melamine, unlike PVC homopolymer, have adequate functionality to react with silane (e.g., Z6020). However, none of the above examples (with the exception of melanine/Z6020) exhibit good adhesion after water submersion. In order to improve adhesion, three cases (5% Z6020 and VAGF/glass; 10% Z6032 and VAGF/glass; and 10% Z6032 and PVC/glass) were repeated wherein the lamination was conducted at 320° F. and a higher pressure of 18 tons with all other lamination conditions remaining the same. In each of these cases good adhesion was achieved after 48 hours of water submersion. No delamination was evident even after 3 months of water submersion nor after 1000 hours of Xe arc exposure. (Xe arc exposure is a process used to simulate accelerated weathering.)

EXAMPLE 4

A ⁵⁄₃₂" thick and a ³⁄₁₆" thick, 12"×12" flat, tempered glass plates were each surface treated with a 5% prehydrolyzed Z6020 solution and press laminated to a 0.002" extruded PVC film printed with an overall decorative design, based on VAGF binder, with the VAGF binder towards the glass. The lamination was conducted at 320° F. and 45 tons pressure for 11 minutes, followed by 7 minutes of cooling under pressure. These conditions were adequate for removal of all trapped air within the two laminated assemblies. In a second step, these laminated assemblies were each further laminated to a 0.080" VCT. This second lamination step was conducted at 200° F. and 30 psi for 4 minutes, followed by 5 minutes of cooling to room temperature. The laminates were then subject to the impact of a 0.5 kg can dropped from a height of 4'. The laminates were then subjected to repeated impact of a 1.5 kg can dropped from various heights which were successively increased until a height of 4' was reached or until the laminated failed. The results of these tests are shown in Table 4.

TABLE 4

| Sample | 0.5 kg Can Drop Height | Support/ Fail | 1.5 kg Can Drop Height | Support/ Fail |
|---|---|---|---|---|
| 5/32" glass/ | 2' | S | 2' | S |
| 0.002" PVC/ | 3' | S | 3' | F |
| 0.080" VCT | 4' | S | 4' | F |
| 3/16" glass/ | 2' | S | 2' | S |
| 0.002" PVC/ | 3' | S | 3' | S |
| 0.080" VCT | 4' | S | 4' | F |

These results show that thicker glass provides greater impact resistance.

It was also determined that a laminated glass floor tile comprising a 0.188" thick glass plate/0.002" PVC film having a decorative pattern/0.080" VCT/0.032" plasticized PVC/0.080" VCT would provide approximately complete resistance to breakage from the impact of a common household object (e.g., a 1.5 kg can) dropped from a height of 36" (i.e., the height of a normal counter-top).

EXAMPLE 5

Two laminated glass tiles were prepared using an autoclave process. Samples of various constructions were prepared using 0.188" thick, 12"×12" tempered glass (pencil edge seamed) from Consolidated Glass of New Castle, Pa. The decorative layer was a 0.002" clear, extruded PVC printed on one side with an overall decorative pattern using a VAGF copolymer binder from Union Carbide. A 0.080" VCT from Congoleum, having an approximate PVC copolymer binder level of 15%, was used as the backing substrate. One tile was laminated with the VAGF side of the decorative pattern was towards the glass, and to obtain adequate adhesion, 5% prehydrolyzed Z6020 was wiped on the glass surface prior to lamination. The second tile was laminated with the PVC homopolymer side towards the glass, and a 10% solution of prehydrolyzed Z6032 was wiped on the glass surface prior to lamination. The constructions were layered together, and each was vacuum sealed in a mylar bag which was coated with an ethylene copolymer hot melt adhesive to the seal the bag. The samples were then placed vertically into an air autoclave and laminated at 285° F. and a pressure of 225 psi for 15 minutes. Samples were then removed from the vacuum bags and submerged in water for 48 hours.

The samples were then inspected for evidence of delamination and were then subjected to the impact of a 1.5 kg can dropped from a height of 4'. The can was dropped repeatedly until the samples failed (i.e., cracking or breaking was evident). After failure, the samples were inspected for adhesion of glass fragments. Table 5 shows the results of these tests.

TABLE 5

| Construction | Support/Fail on First Drop | # Subsequent Drops Until Failure |
|---|---|---|
| 0.188" tempered glass/ 0.080" VCT/ 0.080" VCT | F | 0 |
| 0.188" tempered glass/ 0.002" printed PVC/ | S | 3 |
| 0.035" PVC*/ 0.080" VCT | | |

*Calendared PVC film, containing 80 parts per hundred resin (phr), SE1300 PVC from Shintech, 20 phr dihexyl adipate, 20 phr BBP, 10 phr Capa 650, 5 phr Drapex 6.8, 3 phr UBZ 791 (stabilizer from Baerlocher, USA), 0.1 phr CPL-46, 0.5 phr Tinuvin 328, 2 phr Gem PVC copolymer (E8)

After submersion, neither tile showed any evidence of delamination. Further, after failure, no delamination of fragments occurred. All of the fragments were held in place, indicating good adhesion. These results also demonstrate the importance of an energy absorption layer for improving impact performance.

EXAMPLE 6

Seven different tile constructions were prepared and subjected to the impact of a 1.56 kg can dropped from various heights. All samples contained a decorative layer with the VAGF print side towards to glass and adhered with 10% Z6032P organosilane. The decorative layer was laminated, using a two-step pressing process, to the glass at 320° F. and 45 tons pressure for 12 minutes, followed by 10 minutes of cooling. This assembly was then laminated to the backing substrate at 200° F. and 30 tons pressure for 4 minutes, followed by 10 minutes of cooling. The backing substrate is a highly flexible calendered grade PVC with approximately 55 phr of plasticizer.

The mean height at which each tile construction failed, based on a population of 10 samples, was determined as follows. For each tile construction a first tile was subjected to the impact of a can dropped from a height of 4'. If the glass plate did not fracture, a second tile of the same construction was subjected to the impact of a can dropped from a height 6" higher than the previous drop. This procedure was repeated until a tile of that given construction failed. Once the construction failed, the next tile was subjected to the impact of a can dropped from a height 6" lower than the previous drop. The entire procedure was continued for a total of 10 samples of a given construction, where each tile is only exposed to one impact of the can. The mean height at which each construction failed is calculated from a histogram of the results. In addition, the samples that did not fracture upon impact were subsequently re-impacted with a can dropped from the same height to which each was previously exposed, until that tile failed. From this data, the total percentage of tiles of a particular construction that did not fracture from drop heights greater than or equal to 4' was used as a method for comparing the impact resistance of each type of construction. Further insight can also be gained from the actual number of drop events that occurred at 4' or greater for a given tile construction. In addition, the maximum drop height for which a given tile construction did not fail is used as an indicator of the overall difference in each type of tile construction. Taken collectively, these measurements provide relative insight into what the impact resistance of free-unsupported tiles on a rigid surface, for example, this information is important if such tiles are used on a floating subfloor. These measured results are shown in Table 6.

TABLE 6

| Construction | Mean Break Height (ft) | Maximum Support (ft) | # Impacts Above 4' | % Support Above 4' |
|---|---|---|---|---|
| 0.156" glass/ 0.080" VCT tile/ 0.035" PVC/ 0.080" VCT tile | 4.5 | 5.0 | 15 | 40 |
| 0.188" glass/ 0.080" VCT tile/ 0.035" PVC/ 0.080" VCT tile | 5.0 | 5.5 | 66 | 86 |
| 0.188" glass/ 0.035" VCT tile/ 0.080" VCT tile | 4.0 | 4.0 | 14 | 50 |
| 0.188" glass/ 0.080" VCT tile/ 0.080" VCT tile | 4.5 | 4.5 | 21 | 57 |
| 0.188" glass/ 0.080" VCT tile | 2.5 | 3.0 | 0 | 0 |
| 0.188" glass/ 0.035" PVC/ 0.060" VCT tile | 3.0 | 4.0 | 13 | 61 |
| 0.188" glass/ 0.035" PVC/ 0.080" VCT tile | 5.5 | 6.0 | 274 | 97 |

These data indicate that the impact resistance of a given tile construction is controlled by the choice of materials used in the tile and the placement of the various layers within the laminate structure. For example, the introduction of a low modulus, elastic component (with a potential for kHz frequency dampening) has a dramatic influence, as does its placement in the laminate structure. For example, the tile constructed of 0.188" glass/0.035" PVC/0.080" tile/0.080" tile exhibited significantly better impact resistance than the tile constructed of 0.188" glass/0.080" tile/0.035" PVC/ 0.080" tile, where the only difference was the placement of one of the tile layers. A comparison of tiles having different glass thicknesses (e.g., 0.156" glass/0.080" tile/0.035" PVC/ 0.080" tile versus 0.188" glass/0.080" tile/0.035" PVC/ 0.080" tile) showed a higher impact resistance with thicker glass. Further, a comparison of tiles having different thicknesses of the decorative layer and the backing substrate (e.g., 0.188" glass/0.080" tile versus 0.188" glass/0.035" tile/ 0.060" tile versus 0.188" glass/0.035" tile/0.080" tile) shows the higher impact resistance as this thickness increases. While certain samples exhibited superb impact resistance, such as the tile construction consisting of 0.188" glass/ 0.035" PVC/0.080" tile/0.080" tile, and others failed more readily, this may also be related to differences in the glass temper pattern and the existence of flaws or defects within the polymeric components of the laminate structure.

EXAMPLE 7

Annealed 12"×12" glass plates having various surface textures were treated with prehydrolyzed 5% Z6020 and autoclave laminated to provide a tile construction of 0.188" glass/0.080" transfer printed VCT/0.035" PVC/0.080" VCT (where the transfer printed VCT is a layer with a print design that has been "transfer printed" in a separate process common to a Congoleum method for tile manufacturing, and the print is composed of VAGF copolymer binder which allows for adequate adhesion to the glass plate). After autoclaving, the glass laminates were scored and cut into 4"×4" sections. The various textures, all available from AFG, included Krystal Klear which is a smooth, untextured glass, Solatex™ having a light texturing and Solatex having a heavy texturing. The Solatex™ has embossing on both sides. In addition, 4"×4" sections of polished granite, vitrious ceramic and marble were prepared. Each sample was then subjected to a falling sand test (similar to ASTM D 968) and then evaluated for change in gloss. The samples were mounted 45° from horizontal and were subjected to successful drops of 50 g, 100 g, 200 g, and 650 g (total 1,000 g) of Othawa ASTM 20–30 mesh sand C778 released through a ¾" diameter pipe at the bottom of a container. The resulting gloss was then calculated. These 4 drops were repeated 4 times for each sample. The results are presented in Table 7.

TABLE 7

| Surface | Initial Gloss | Gloss after 1000 g Sand Drop | % Change |
|---|---|---|---|
| Granite (polished) | 91.6 | 70.9 | 23 |
| Solite ™ (heavy texture) | 36.6 | 30.5 | 17 |
| Solite ™ (light texture) | 74.6 | 52.1 | 30 |
| Krystal Klear ™ (smooth) | 98.5 | 86.0 | 13 |
| Vitrious Ceramic | 91.7 | 81.8 | 11 |
| Marble (polished) | 46.0 | 21.2 | 54 |

In addition, tempered glass plates of the same constructions were autoclave laminated and subjected to a relative abrasion test together with samples of granite, marble, vitrious ceramic and melanine/wood laminate tiles. A wooden block was wrapped with 120 grit $Al_2O_3$ sand paper and was pressed horizontally onto each sample with a 1 kg weight. The block was then pulled across the surface via BYK-Gardner abrasive tester at a fixed rate of 37 cycles/ minute for a total of 200 cycles. The resulting gloss was then calculated. The samples were also subjected to a qualitative razor blade scratch test conducted by hand to determine the relative resistance of each material to the propagation of a continuous scratch. The results of these tests are given in Table 8.

TABLE 8

| Sample Surface | Initial Gloss (60°, 7 measurements) | Final Gloss (60°, 7 measurements) | % Change | Razor Blade Scratch |
|---|---|---|---|---|
| melamine/ wood | 14.5 ± 0.2 | 24 ± 4 | 0.65 | deep scratch |
| granite | 90.1 ± 1 | 69.1 ± 6 | −23% | no scratch |
| Solatex (heavy texture) | 35.9 ± 1 | 31.1 ± 2 | −13% | no scratch |
| Solatex (light texture) | 66.5 ± 9 | 61.9 ± 12 | −7% | no scratch |
| Krystal Klear (smooth) | 94.7 ± 0.5 | 72 ± 10 | −23% | no scratch |
| Vitrious Ceramic | 95 ± 2 | 76 ± 11 | −20% | no scratch |
| Marble | 54.7 ± 4 | 7.7 ± 3 | −86% | moderate scratch |

These data show that under abrasive conditions, glass will perform as well as or better than other hard surface materials. Further, textured glass performs better than smooth glass due to the shorter mean free path of scratch propagation, since the abrasive substance changes its path due to surface obstruction associated with the embossed texture.

EXAMPLE 8

Tempered and annealed, pencil edge ground, 12"×12" glass plates were treated with prehydrolyzed 5% Z6020 and autoclave laminated to provide a tile having a construction of 0.188" glass/0.080" transfer printed VCT/0.035" calendered PVC/0.080" VCT. Three glass textures were used including Krystal Klear smooth and Solite (heavy and light texture). From these various textured glass tiles, a 4'×11' "traffic plaque" was prepared on a concrete subfloor to demonstrate the use of annealed glass perimeter material and the use of both resilient and rigid grouts and adhesives to affix the tiles to the subfloor, which in one portion is a floating subfloor.

Figure 12:
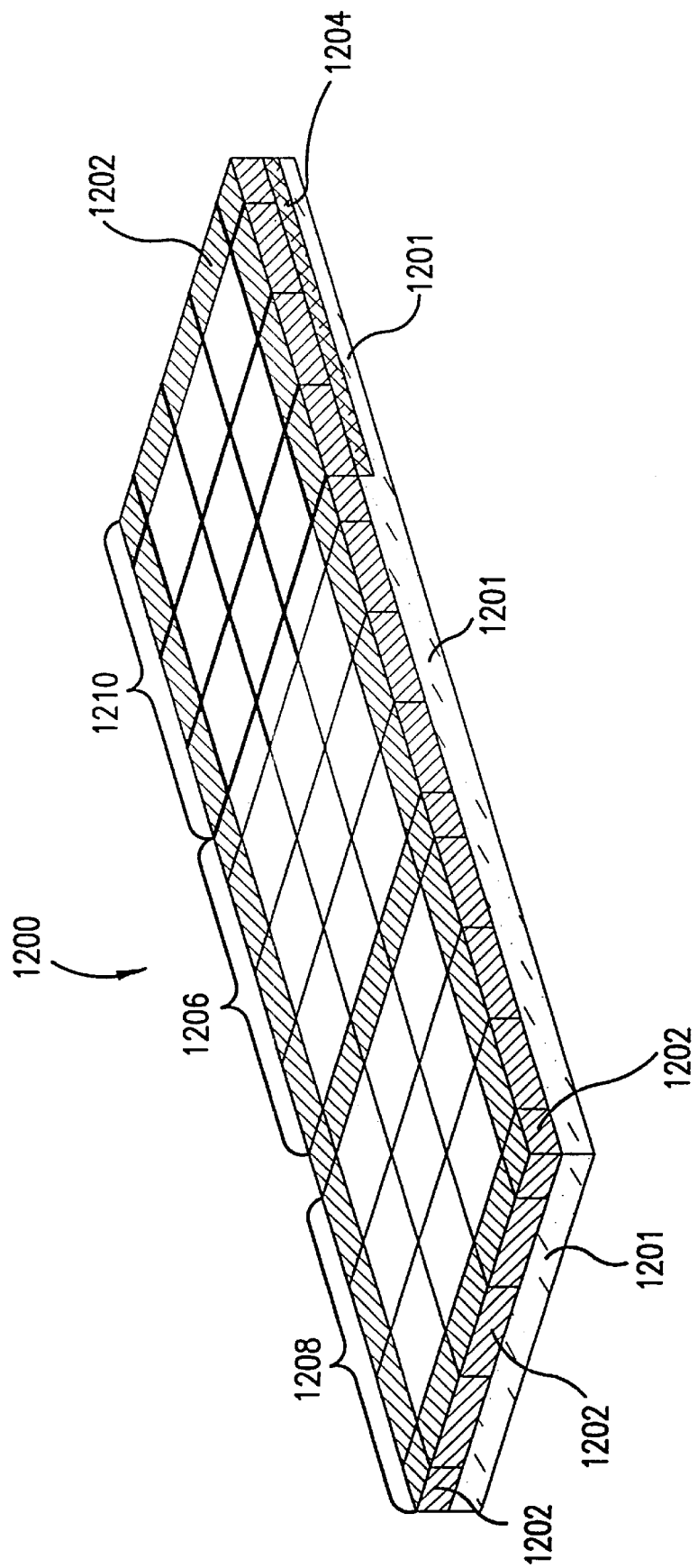
FIG. 12 is a perspective view of a traffic plaque.

FIG. 12 shows a perspective view of the traffic plaque 1200 which was placed on a concrete subfloor 1202. Textures were randomly placed into the assembly; however, the annealed laminates 1202 were scored and cut into both 6"×12" and 6"×6" sections and used for the perimeter and corners, respectively. In one section 1206 a rigid grout was used which was a ¼" spaced cementitious non-sanded grout traditionally used for marble and granite. In another section, 1208 a flexible grout was used which was a ⅛" spaced caulk (DAPAlex Plus). In yet a third section 1210 a second flexible grout was used which was a 1/16" spaced DAP grey concrete sealer. Adhesives used included Congoleum AD72 wet set (applied with a 1/16" trowel), which was used in the area with the rigid grout 1206, and Congoleum AD52 clear thin spread, which was used in the area with the flexible grout 1208. In one portion where the flexible grout was used 1208, the AD52 adhesive was placed directly onto Congoleum SU-1 floating subfloor material 1204 with no adhesive between the subfloor 1201 and the SU-1 floating subfloor 1204. After months of continuous traffic across the traffic plaque, no breakage, wear or grout cracking was observed.

In a second test, tempered glass tiles were affixed to an existing vinyl floor, which itself was affixed to a traditional plywood subfloor, using a ⅓" trowel Congoleum 3020 polymeric reinforced concrete mortar adhesive and a ⅛" DAP grey concrete sealant as a flexible caulk. Annealed glass tiles were used for the perimeter. Again, owing to the flexibility of the annealed glass and the strength of the tempered glass, this flooring installation successfully endured the continuous stress of traffic and flexing which is common to a plywood subfloor. Traditional materials, such as ceramic and marble would be proven prone to cracking under these installation conditions.

Various embodiments of the invention have been described. The descriptions are intended to be illustrative of the present invention. It will be apparent to one of skill in the art that modifications may be made to the invention as described without departing from the scope of the claims set out below. For example, it is to be understood that although the invention has been described using particular backing substrates and adhesives with a glass plate, any type of backing substrate or adhesive is contemplated to fall within the scope of the invention. Further, although the laminated glass floor tile has been described as particularly useful for constructing a floor, the tiles may have other uses, decorative and functional, which are also contemplated to fall within the scope of the invention.

What is claimed is:

1. A laminated glass floor tile, comprising:
   a glass plate;
   an opaque backing substrate that extends beyond the entire perimeter of said glass plate and having a top surface;
   a decorative layer comprising a printed decorative pattern on said top surface of said opaque backing substrate, wherein said printed decorative pattern comprises an ink that comprises an adhesive for bonding said top surface of said opaque backing substrate to said glass plate; and
   wherein said glass plate, said backing substrate and said decorative layer are a laminate.
2. The laminated glass floor tile of claim 1, wherein said glass plate is tempered glass.
3. The laminated glass floor tile of claim 1, wherein said glass plate is annealed glass.
4. The laminated glass floor tile of claim 1, wherein said glass plate is texturized.
5. The laminated glass floor tile of claim 4, wherein said glass plate is texturized on a bottom side adjacent to said decorative layer.
6. The laminated glass floor tile of claim 1, wherein said glass plate has a protective coating on a top side of said glass plate.
7. The laminated glass floor tile of claim 6, wherein said protective coating is selected from the group consisting of aluminosilicate, a plasma, a diamond-like plasma, an alumino-silicate plasma, a borosilicate and a carbide plasma.
8. The laminated glass floor tile of claim 1, wherein said backing substrate comprises a plastic material.
9. The laminated glass floor tile of claim 8, wherein said backing substrate is selected from the group consisting of plasticized polyvinyl chloride homopolymer, plasticized polyethylene-vinyl acetate copolymer, polyvinylbutyral, a vinyl composition tile and mixtures thereof.
10. The laminated glass floor tile of claim 1, wherein said backing substrate is selected from the group consisting of a metal, ceramic, a composite and mixtures thereof.
11. The laminated glass floor tile of claim 1, wherein said backing substrate comprises an energy absorbing layer.
12. The laminated glass floor tile of claim 1, wherein said backing substrate comprises at least two layers.
13. The laminated glass floor tile of claim 1, wherein said adhesive comprises a copolymer.
14. The laminated glass floor tile of claim 13 wherein said copolymer further comprises a functional group selected from the group consisting of a hydroxyl group, a carboxylic acid group, PVC copolymers, PVB, urethane, vinyl formal, vinyl butyral, vinyl chloride, acrylic, vinyl acetate, maleic acid and anhydride groups, vinyl containing silane and mixtures thereof.
15. The laminated glass floor tile of claim 1, wherein said adhesive comprises an organosilane coupling agent.
16. The laminated glass floor tile of claim 15, wherein said organosilane coupling agent is selected from the group consisting of a prehydrolyzed silanol monomer, a prehydrolyzed silanol dimer, a prehydrolyzed silanol oligomer, aminoethylaminopropyl trimethoxysilane, styrylaminosilane, mercapto-silane, methacryloxypropyl and mixtures thereof.
17. A laminated glass floor tile, comprising:
   a glass plate;
   an opaque backing substrate that extends beyond the entire perimeter of said glass plate;
   a decorative layer comprising a polymeric film having a decorative pattern printed thereon disposed between said glass plate and said backing substrate;
   an adhesive disposed on a top side of said polymeric film for bonding said top side of said polymeric film to said glass plate; and
   wherein said glass plate, said backing substrate and said decorative layer are a laminate.
18. The laminated glass floor tile of claim 17, wherein said decorative pattern contains said adhesive.
19. The laminated glass floor tile of claim 17, further comprising a second decorative layer disposed between said glass plate and said backing substrate.

20. The laminated glass floor tile of claim 17, wherein said glass plate is tempered glass.

21. The laminated glass floor tile of claim 17, wherein said glass plate is annealed glass.

22. The laminated glass floor tile of claim 17, wherein said glass plate is texturized.

23. The laminated glass floor tile of claim 22, wherein said glass plate is texturized on a bottom side adjacent to said decorative layer.

24. The laminated glass floor tile of claim 17, wherein said glass plate has a protective coating on a top side.

25. The laminated glass floor tile of claim 24, wherein said protective coating is selected from the group consisting of aluminosilicate, a plasma, a diamond-like plasma, an alumino-silicate plasma, a borosilicate and a carbide plasma.

26. laminated glass floor tile of claim 17, wherein said backing substrate comprises a plastic material.

27. The laminated glass floor tile of claim 26, wherein said backing substrate is selected from the group consisting of plasticized polyvinyl chloride homopolymer, plasticized polyethylene-vinyl acetate copolymer, polyvinylbutyral, a vinyl composition tile and mixtures thereof.

28. The laminated glass floor tile of claim 17, wherein said backing substrate is selected from the group consisting of a metal, a ceramic, a composite and mixtures thereof.

29. The laminated glass floor tile of claim 17, wherein said backing substrate comprises an energy absorbing layer.

30. The laminated glass floor tile of claim 17, wherein said backing substrate comprises at least two layers.

31. The laminated glass floor tile of claim 17, wherein said adhesive comprises a copolymer.

32. The laminated glass floor tile of claim 31 wherein said copolymer further comprises a functional group selected from the group consisting of a hydroxyl group, a carboxylic acid group, PVC copolymers, PVB, urethane, vinyl formal, vinyl butyral, vinyl chloride, acrylic, vinyl acetate, maleic acid and anhydride groups, vinyl containing silane and mixtures thereof.

33. The laminated glass floor tile of claim 17, wherein said adhesive comprises an organosilane coupling agent.

34. The laminated glass floor tile of claim 33, wherein said organosilane coupling agent is selected from the group consisting of a prehydrolyzed silanol monomer, a prehydrolyzed silanol dimer, a prehydrolyzed silanol oligomer, aminoethylaminopropyl trimethoxysilane, styrylaminosilane, mercapto-silane, methacryloxypropyl and mixtures thereof.

35. A glass flooring, comprising:
a plurality of laminated glass floor tiles positioned on a floor, each of said laminated glass floor tiles comprising a glass plate, an opaque backing substrate that extends beyond the entire perimeter of said glass plate, a decorative layer comprising a printed decorative pattern on a top surface of said opaque backing substrate, wherein said printed decorative pattern comprises an ink that comprises an adhesive for bonding said top surface of said opaque backing substrate to said glass plate, wherein each of said laminated glass floor tiles is positioned such that said glass plate is on top; and
a flooring adhesive disposed between each of said plurality of laminated glass floor tiles.

36. The glass flooring of claim 35 wherein said glass plate is tempered glass.

37. The glass flooring of claim 36 further comprising, a plurality of perimeter floor tiles positioned along the perimeter of said floor, each comprising an annealed glass plate and a backing substrate laminated to said glass plate.

38. The glass flooring of claim 36 further comprising, a plurality of perimeter floor tiles positioned along the perimeter of said floor, each comprising a chemically tempered glass plate and a backing substrate laminated to said glass plate.

39. The glass flooring of claim 35, wherein said flooring adhesive is resilient.

40. The glass flooring of claim 35 further comprising, a floating subfloor disposed on top of said floor.

41. The glass flooring of claim 35 further comprising, a grid on top of said floor into which each of said plurality of laminated glass floor tiles is placed.

42. A laminated glass floor tile, comprising:
a glass plate having texture on a first side and having a second side opposite said first side;

an opaque backing substrate that extends beyond the entire perimeter of said glass plate;

a decorative layer comprising a polymeric film having a decorative pattern printed thereon disposed between said second side of said glass plate and said backing substrate;

an adhesive disposed on a top side of said polymeric film for bonding said top side of said polymeric film to said second side of said glass plate;

an energy absorbing layer disposed between said second side of said glass plate and said backing substrate; and wherein said glass plate, said backing substrate, said decorative layer, and said energy absorbing layer are a laminate.

43. The laminated glass floor tile of claim 42, further comprising a second decorative layer disposed between said polymeric film and said backing substrate.

44. The laminated glass floor tile of claim 42, wherein said decorative pattern comprises said adhesive.

45. The laminated glass floor tile of claim 42, wherein said second side of said glass plate has texture.

46. A glass flooring, comprising:
a plurality of laminated glass floor tiles positioned on a floor, each of said laminated glass floor tiles comprising a glass plate, an opaque backing substrate that extends beyond the entire perimeter of said glass plate, a decorative layer comprising a polymeric film having a decorative pattern printed thereon disposed between said glass plate and said backing substrate, an adhesive disposed on a top side of said polymeric film for bonding said top side of said polymeric film to said glass plate, wherein each of said laminated glass floor tiles is positioned such that said glass plate is on top; and a flooring adhesive disposed between each of said plurality of laminated glass floor tiles.

47. The glass flooring of claim 46 wherein said glass plate is tempered glass.

48. The glass flooring of claim 47 further comprising, a plurality of perimeter floor tiles positioned along the perimeter of said floor, each comprising an annealed glass plate and a backing substrate laminated to said glass plate.

49. The glass flooring of claim 47 further comprising, a plurality of perimeter floor tiles positioned along the perimeter of said floor, each comprising a chemically tempered glass plate and a backing substrate laminated to said glass plate.

50. The glass flooring of claim 46, wherein said flooring adhesive is resilient.

51. The glass flooring of claim 46 further comprising, a floating subfloor disposed on top of said floor.

52. The glass flooring of claim 46 further comprising, a grid on top of said floor into which each of said plurality of laminated glass floor tiles is placed.

* * * * *